US011793205B2

(12) United States Patent
Huckabee et al.

(10) Patent No.: US 11,793,205 B2
(45) Date of Patent: Oct. 24, 2023

(54) OIL-BASED INSECTICIDAL AND INSECT REPELLENT COMPOSITIONS

(71) Applicant: S. C. Johnson & Son, Inc., Racine, WI (US)

(72) Inventors: Alexis Huckabee, Kenosha, WI (US); Amber J. Yeary, Racine, WI (US); Cassidy N. Shepherd, Wauwatosa, WI (US)

(73) Assignee: S. C. JOHNSON & SON, INC., Racine, WI (US)

( * ) Notice: Subject to any disclaimer, the term of this patent is extended or adjusted under 35 U.S.C. 154(b) by 0 days.

(21) Appl. No.: 17/989,529

(22) Filed: Nov. 17, 2022

(65) Prior Publication Data

US 2023/0148610 A1    May 18, 2023

Related U.S. Application Data

(60) Provisional application No. 63/280,982, filed on Nov. 18, 2021, provisional application No. 63/280,986, filed on Nov. 18, 2021.

(51) Int. Cl.
| | |
|---|---|
| *A61K 36/00* | (2006.01) |
| *A01N 65/22* | (2009.01) |
| *A01N 25/02* | (2006.01) |
| *A01N 25/30* | (2006.01) |
| *A01N 31/02* | (2006.01) |
| *A01P 17/00* | (2006.01) |

(52) U.S. Cl.
CPC ............ *A01N 65/22* (2013.01); *A01N 25/02* (2013.01); *A01N 25/30* (2013.01); *A01N 31/02* (2013.01); *A01P 17/00* (2021.08)

(58) Field of Classification Search
CPC ....................................................... A01P 17/00
See application file for complete search history.

(56) References Cited

U.S. PATENT DOCUMENTS

| | | | |
|---|---|---|---|
| 9,326,524 | B1 | 5/2016 | Jack et al. |
| 2004/0253287 | A1 | 12/2004 | Denton |
| 2008/0187607 | A1 | 8/2008 | Bessette |
| 2008/0269177 | A1* | 10/2008 | Bessette .............. A01N 65/16 514/163 |
| 2019/0274312 | A1 | 9/2019 | Bissinger et al. |
| 2020/0120724 | A1* | 4/2020 | Vaidya ................. H04W 24/10 |
| 2023/0042086 | A1 | 2/2023 | Calderas et al. |
| 2023/0045266 | A1 | 2/2023 | Calderas et al. |

FOREIGN PATENT DOCUMENTS

| | | | |
|---|---|---|---|
| CN | 105017875 | A * | 11/2015 |
| CN | 106619473 | A | 5/2017 |
| EP | 3639666 | A1 | 4/2020 |
| WO | 2009147648 | A2 | 12/2009 |
| WO | 2013155438 | A1 | 10/2013 |

OTHER PUBLICATIONS

Anonymous, "Ecotec Broad Spectrum Insecticide and Miticide", Jul. 31, 2012, XP093032422, Retrieved from the Internet: https://www.domyown.com/msds/Ecotec-Label.pdf.

Anonymous, "EPA R.E.D. Facts—Soap Salts", United States Office of Environmental Protection Agency, Office of Prevention, Pesticides and Toxic Substances (7508W), EPA-738-F-92-013, Sep. 30, 1992, XP093032860.

Anonymous, "EPA R.E.D. Facts—Wood Oils and Gums (Cedarwood Oil)", United States Office of Environmental Protection Agency, Office of Prevention, Pesticides and Toxic Substances (7508W), EPA-738-F-93-008, Sep. 1993, XP93033492.

Anonymous, "Treating Head Lice Infestations with Resultz, Lice Treatment About Lice and Their Life Cycle", Apr. 30, 2019, XP093031967, Retrieved from the Internet: https://www.miravohealthcare.com/wp-content/uploads/2020/11/Resultz-CM-ENG-April-2019.pdf.

Baker et al., "Cedarwood Oil Profile Cedarwood Oil Profile Active Ingredient Eligible for Minimum Risk Pesticide Use", Dec. 31, 2018, pp. 1-8, XP093033489.

Baker et al., "Mint and Mint Oil Profile Mint and Mint Oil Profile Active Ingredient Eligible for Minimum Risk Pesticide Use", Jan. 20, 2020, XP093032381, Retrieved from the Internet: http://hdl.handle.net/1813/56133.

Bakr et al., "Insecticidal activity of Four Volatile Oils on Two Museum Insects Pests", Egypt. Acad. J. Biology. Sci., (2):57-66 (2010), XP093032404.

International Search Report and Written Opinion in Application No. PCT/US2022/050382 dated Mar. 29, 2023.

International Search Report and Written Opinion in Application No. PCT/US2022/050377 dated Mar. 29, 2023.

International Search Report and Written Opinion in Application No. PCT/US2022/050379 dated Mar. 28, 2023.

Isman et al., "Bioinsecticides based on plant essential oils: A short overview", Journal of Biosciences, vol. 75, No. 7-8. Apr. 24, 2020, pp. 179-182, XP055825088.

Isman et al., "Insecticidal Activities of Commercial Rosemary Oils (*Rosmarinus officinalis*) Against Larvae of Pseudaletia unipuncta and Trichoplusia ni in Relation to Their Chemical Compositions", Pharmaceutical Biology, vol. 46, No. 1-2, Jan. 1, 2008, pp. 82-87, XP093032563.

Kowalska et al., "Cinnamon as a Useful Preventive Substance for the Care of Human and Plant Health", Molecules, vol. 26, No. 17, Aug. 31, 2021, pp. 5299, XP093033486.

Mohafrash et al., "Mentha spicata essential oil nanoformulation and its larvicidal application against Culex pipiens and *Musca domestica*", Industrial Crops and Products, vol. 157, Sep. 19, 2020, 112944, XP086319242.

Saraiva, "Insecticidal and repellent activity of geranium essential oil against *Musca domestica* and Lucilia cuprina", International Journal of Tropical Insect Science, vol. 40, Mar. 24, 2020, pp. 1093-1098, XP09303360.

(Continued)

*Primary Examiner* — Qiuwen Mi
(74) *Attorney, Agent, or Firm* — Quarles & Brady LLP

(57) ABSTRACT

A pest control composition, the composition including an active component that includes between about 0.1 wt. % and about 11 wt. % of a mint oil and between about 0.05 wt. % and about 5 wt. % rosemary oil. The composition further includes a carrier, a solvent, and a dehydrate.

20 Claims, No Drawings

(56) References Cited

OTHER PUBLICATIONS

Stansly, P. et al., "Crop and Inset Response to Horticultural Mineral Oil on Tomatot and Pepper", Proc. Fla. State Hort. Soc. 118:132-141, 2005, XP093031938.
Yang et al., "Fumigant toxicity and physiological effects of spearmint (Mentha spicata, Lamiaceae) essential oil and its major constituents against Reticulitermes dabieshanensis", Industrial Crops and Products, vol. 171, Aug. 12, 2021, 113894, XP086773728.
Non-Final Office Action in U.S. Appl. No. 17/989,529 dated Feb. 3, 2023.
Final Office Action in U.S. Appl. No. 17/989,529 dated Mar. 24, 2023.
International Search Report and Written Opinion in Application No. PCT/US2022/050376 dated Mar. 24, 2023, 15 pages.

\* cited by examiner

OIL-BASED INSECTICIDAL AND INSECT REPELLENT COMPOSITIONS

CROSS REFERENCE TO RELATED APPLICATIONS

This application is related to, claims priority to, and incorporates herein by reference for all purposes U.S. Provisional Patent Application No. 63/280,982, filed Nov. 18, 2021, and U.S. Provisional Patent Application No. 63/280,986, filed on Nov. 18, 2021.

REFERENCE REGARDING FEDERALLY SPONSORED RESEARCH OR DEVELOPMENT

Not applicable.

SEQUENCE LISTING

Not applicable.

BACKGROUND

1. Technology Field

The present disclosure relates to a pest control composition, and more particularly to an oil-based insecticidal composition, that includes at least one mint oil (e.g., one of spearmint, peppermint, and cornmint oil) and rosemary oil. In further embodiments, the present disclosure also relates to an insecticidal or insect repellent composition that includes an active component having at least spearmint oil and rosemary oil.

2. Description of the Background

Pest control compositions, including insecticide and insect repellent compositions have been used over the years to prevent insects from attacking humans, animals, and crops. Various chemicals and mixtures have been studied for pesticidal activity over the years, but there is still the need to obtain an insecticide and insect repellent composition that is natural and selective for invertebrates, such as insects, and does not damage the environment.

A further potential disadvantage of insecticide and insect repellent compositions currently available is their unpleasant, harsh, and lingering chemical odor. In providing insecticide and insect repellent compositions with a more pleasant and less harsh odor, pest killing/repelling efficacies, and/or time to achieve pest mortality are comprised due to the necessity to employ fewer, or reduced concentrations, of chemical active ingredients and inert ingredients.

Therefore, it is also desirable to have a pest control composition, for example, an insecticidal or an insect repellent composition that reduces the unpleasant, harsh, and lingering chemical odor and at the same time does not sacrifice the efficacy of the composition.

SUMMARY

Embodiments of the current disclosure describe a pest control composition, for example, a composition for killing insects. In one embodiment, the composition includes an active component that includes between about 0.1 wt. % and about 11 wt. % of a mint oil selected from the group consisting of spearmint oil, peppermint oil, and cornmint oil, and between about 0.05 wt. % and about 5 wt. % rosemary oil. In this embodiment, the composition further includes a carrier, a solvent, and a dehydrate. Further, in all embodiments, all weight percentages are percent by weight of the total composition In other embodiments, the composition includes the active component in an amount between about 0.5 wt. % and about 15 wt. %. In certain embodiments, the mint oil is between about 1 wt. % and about 2 wt. %, and the rosemary oil is between about 0.6 wt. % and about 1 wt. %. In particular embodiments, the composition includes a weight ratio of the mint oil to rosemary oil from about 1.5:1 to about 2.2:1.

In some embodiments, the carrier is selected from the group consisting of mineral oil, aliphatic $C_9$-$C_{14}$ hydrocarbons, alicyclic $C_9$-$C_{14}$ hydrocarbons, naphtha, petroleum distillate, paraffins, iso-paraffins, isoparaffinic hydrocarbons, cycloparaffins, alkanes, iso-alkanes, cycloalkanes, and any combinations thereof. In further embodiments, the solvent is selected from the group consisting of ethyl lactate, butyl lactate, isopropyl alcohol, propylene carbonate, and combinations thereof. In even further embodiments, the dehydrate is isopropyl myristate.

In certain embodiments, the composition includes about 60 wt. % to about 90 wt. % of the carrier, about 3 wt. % to about 10 wt. % of the solvent, about 1 wt. % to about 15 wt. % of the dehydrate, and about 1 wt. % to about 5 wt. % of a propellant. In these embodiments, the propellant is selected from the group consisting of compressed gas propellants, liquefied gas propellants, saturated hydrocarbons, mixtures of liquified gas and compressed gas, methane, ethane, propane, pentane, isobutene, n-butane, isobutane, dimethyl ether, 1, 1-difluoroethane, 1,1,1,2-tetrafluoroethane, carbon dioxide, nitrogen, air, and any combinations thereof. Further, in other embodiments, the mint oil is in a higher weight percentage concentration than the rosemary oil.

According to another aspect of the present disclosure, another pest control composition is provided. In this embodiment, the composition includes an active component that includes between about 0.05 wt. % and about 5 wt. % rosemary oil and between about 0.1 wt. % and about 11 wt. % of at least one mint oil. The composition also includes a carrier, a solvent, and a dehydrate.

In another embodiment, the mint oil is selected from the group consisting of spearmint oil, peppermint oil, cornmint oil, and combinations thereof. Additionally, the composition may include about 60 wt. % to about 90 wt. % of the carrier, about 3 wt. % to about 10 wt. % of the solvent, about 1 wt. % to about 15 wt. % of the dehydrate, and about 1 wt. % to about 5 wt. % of a propellant. Further, in this embodiment, the mint oil and the rosemary oil have a weight ratio of from about 1:1 to about 3:1. In some embodiments, the carrier is mineral oil.

In certain embodiments, the solvent is selected from the group consisting of ethyl lactate, butyl lactate, isopropyl alcohol, propylene carbonate, and combinations thereof. In further embodiments, the dehydrate is isopropyl myristate and the mint oil is spearmint oil. In other embodiments, the propellant is selected from the group consisting of methane ethane, propane, pentane, isobutene, n-butane, isobutane, dimethyl ether, 1, 1-difluoroethane, 1,1,1,2-tetrafluoroethane, carbon dioxide, nitrogen, air, and any combinations thereof.

According to yet another embodiment of the present disclosure, another pest control composition is provided. Here, the composition includes an active component that includes between about 0.1 wt. % and about 11 wt. % of a mint oil selected from the group consisting of spearmint oil, peppermint oil, cornmint oil, and combinations thereof, and between about 0.05 wt. % and about 5 wt. % rosemary oil. Further, the composition includes about 60 wt. % and 90 wt. % of at least one carrier, about 3 wt. % and about 10 wt. % of at least one solvent, and about 1 wt. % and about 15 wt. % of at least one dehydrate. Even further, a weight ratio of the spearmint oil to rosemary oil is from about 1:1 to about 3:1.

DETAILED DESCRIPTION

The term "about" or "approx.", as used herein, refers to variation in the numerical quantity that may occur, for example, through typical measuring and liquid handling procedures used for making concentrates or solutions in the real world; through inadvertent error in these procedures; through differences in the manufacture, source, or purity of the ingredients used to make the compositions or carry out the methods; and the like. The term "about" may also encompass amounts that differ due to different equilibrium conditions for a composition resulting from a particular initial mixture. In one embodiment, the term "about" refers to a range of values +/−5% of a specified value.

The term "weight percent", ".%", "wt. %," "percent by weight", "% by weight", and variations thereof, as used herein, refer to the concentration of a substance as the weight of that substance divided by the total weight of the composition and multiplied by 100. It is understood that, as used here, "percent", "%", and the like may be synonymous with "weight percent", "%", etc.

As used herein, "pests" can mean any organism whose existence it can be desirable to control. Pests can include, for example, bacteria, cestodes, fungi, insects, nematodes, parasites, plants, and the like. In addition, as used herein, "pesticidal" can mean, for example, antibacterial, antifungal, antiparasitic, herbicidal, insecticidal, and the like.

More so, for purposes of simplicity, the term "insect" is used in this application. However, it should be understood that the term "insect" refers, not only to insects, but may also refer to mites, spiders, and other arachnids, larvae, and like invertebrates. Further, for purposes of this application, the term "pest control" shall refer to having a repellent effect, a pesticidal effect, or both. "Repellent effect" is an effect wherein more insects are repelled away from a host or area that has been treated with the composition than a control host or area that has not been treated with the composition. Similarly, the term "repellency" or "repelling" or "repel" refers to the ability of the compositions described herein to cause a pest or insect to deviate away from or avoid a surface, object or insect breeding site treated with said composition. In some embodiments, as will be shown in the present disclosure, a repellent effect is an effect wherein at least about 75% of insects are repelled away from a host or area that has been treated with the composition. In some embodiments, however, a repellent effect is an effect wherein at least about 90% of insects are repelled away from a host or area that has been treated with the composition. In addition, "pesticidal effect" or "insecticidal effect" is an effect wherein treatment with a composition causes at least about 1% of the insects to die. In this regard, an LC1 to LC100 (lethal concentration) or an LD1 to LD100 (lethal dose) of a composition will cause a pesticidal effect. In some embodiments, the pesticidal effect or the insecticidal effect is an effect wherein treatment with a composition causes at least about 5% of the exposed insects to die. In some embodiments, the target pest is a non-insect, such as a parasite.

As used herein, the term "killing" or "kill" refers to the ability of at least one active ingredient in a composition to render an insect dead. As further used herein, the term "knocking down" or "knockdown" refers to the ability of the composition described herein to render an insect immobile for a pre-determined period of time. For example, a flying insect contacted with a composition described herein is said to be "knocked-down" if it falls to ground and is unable to fly, even though it may be able to move body parts so it cannot be categorized as completely paralyzed. The insect's ability to move, feed, reproduce, spread disease, or irritate is severely curtailed during the period in which it is knocked down.

Embodiments of the invention can be used to control parasites. The term "parasite" encompasses numerous protozoa, helminths, and ectoparasites. Protozoa may include the ameba, flagellates, ciliates, and the sporozoa. Protozoa typically infect the blood and tissue and may be transmitted through the bite of a mosquito. Protozoa are responsible for such diseases as malaria, trypanosomiasis, leishmaniasis, toxoplasmosis, and cryptosporidiosis. Helminths are typically classified into three groups, flatworms, roundworms, and thorny-headed worms. Helminths are responsible for such diseases as enterobiasis, ascariasis, taeniasis, cysticercosis, and schistosomiasis. Ectoparasites may include mosquitoes, ticks, fleas, lice, and mites. Many ectoparasites may cause disease on their own, but are even more important as vectors of a number of different pathogens, including protozoa.

In the pest control field, it is known that consumers desire a product having a reduced unpleasant, harsh, and lingering chemical odor, without sacrificing efficacy. Therefore, it is important to develop a pest control composition, for example, an insecticidal composition and an insect repellent composition, that offer pleasant hedonics and at the same time do not compromise the insect killing/repelling efficacies. It has been found that an insecticidal composition and an insect repellent composition that includes a mint oil selected from the group consisting of spearmint oil, peppermint oil, and cornmint oil and rosemary oil provides such benefits.

The pest control composition according to an embodiment of the present disclosure is a composition that includes at least one mint oil (e.g., spearmint oil, peppermint oil, and/or cornmint oil) and rosemary oil. The compositions described herein present a novel and synergistic combination of essential oil active ingredients: a mint oil (e.g., spearmint oil, peppermint oil, and/or cornmint oil) and rosemary oil, resulting in an improved pest control composition that offers consumers a dual action experience—pleasant low lingering hedonics, without sacrificing efficacy and/or time to achieve the desired insecticidal and/or repellent activity. The pleasant fragrance experience also allows the user to spray the pests in a room and remain in the room following application of the composition. In particular, the pest control composition described herein causes pest mortality from small to large pests by at least weakening the pest's exoskeleton and/or obstructing the pest's central nervous system, resulting in a pest knockdown rate as much as 90% in 30 seconds and a pest mortality rate as much as 100% in 24 hours. Applicant also discovered that the novel combination of mint oil (e.g., spearmint oil, peppermint oil, and/or cornmint oil) and rosemary oil unexpectedly masks or neutralizes the harsh odor of common additional ingredients (such as ethyl lactate or butyl lactate) present in insecticidal compositions.

In certain embodiments, the pest control compositions include an active component and other components. In some embodiments, the active component comprises one or more essential oils, such as at least one mint oil (e.g., spearmint oil, peppermint oil, and cornmint oil) and rosemary oil. The compositions of the present disclosure may also include one or more additional components. In certain embodiments, for example, the compositions of the present disclosure may include at least one of a carrier, a solvent, a dehydrate, and/or a propellant.

In certain embodiments, the pest control composition includes (i) mint oil selected from the group consisting of spearmint oil, peppermint oil, cornmint oil, and any combinations thereof, and (ii) rosemary oil. In other embodiments, the pest control composition includes (i) mint oil selected from the group consisting of spearmint oil, peppermint oil, cornmint oil, and any combinations thereof, (ii) rosemary oil, and (iii) a solvent. In further embodiments, the pest control composition includes (i) mint oil selected from the group consisting of spearmint oil, peppermint oil, and cornmint oil, and any combinations thereof, (ii) rosemary oil, and (iii) a dehydrate. In even further embodiments, the pest control composition includes (i) mint oil selected from the group consisting of spearmint oil, peppermint oil, and cornmint oil, and any combinations thereof, (ii) rosemary oil, and (iii) a propellant. In some embodiments, the pest control composition includes (i) mint oil selected from the group consisting of spearmint oil, peppermint oil, and cornmint oil, and any combinations thereof, (ii) rosemary oil, (iii) a solvent, and (iv) a carrier. In other embodiments, the pest control composition includes (i) mint oil selected from the group consisting of spearmint oil, peppermint oil, and cornmint oil, and any combinations thereof, (ii) rosemary oil, (iii) a solvent, (iv) a carrier, and (v) a propellant. In other embodiments, the pest control composition includes (i) mint oil selected from the group consisting of spearmint oil, peppermint oil, and cornmint oil, and any combinations thereof, (ii) rosemary oil, (iii) a solvent, (iv) a carrier, and (v) a dehydrate. In further embodiments, the pest control composition includes (i) mint oil selected from the group consisting of spearmint oil, peppermint oil, and cornmint oil, and any combinations thereof, (ii) rosemary oil, (iii) a solvent, (iv) a carrier, (v) a dehydrate, and (vi) a propellent.

In some embodiments, an active component of the pest control composition of the present disclosure includes one or more essential oils (e.g., spearmint oil, rosemary oil, peppermint oil, cornmint oil, and any combinations thereof). In some embodiments, the active component of the pest control composition includes at least one mint oil and rosemary oil. In further embodiments, the pest control composition includes essential oils consisting essentially of mint oil and rosemary oil, and in even further embodiments, the pest control composition includes essential oils consisting of mint oil and rosemary oil.

The total amount of the active component (e.g., the total amount of essential oils in the composition) may be from about 0.05 wt. %, or from about 0.5 wt. %, or from about 1 wt. %, or from about 2 wt. %, or from about 2.5 wt. %, or from about 5 wt. %, or from about 6 wt. %, or from about 7 wt. %, or from about 8 wt. %, or from about 9 wt. %, or from about 10 wt. %, and to about 25 wt. %, or to about 22 wt. %, or to about 20 wt. %, or to about 17 wt. %, or to about 15 wt. %, or to about 12 wt. %, or to about 8 wt. %, or to about 6 wt. %, or to about 4 wt. %, or to about 3 wt. %, or to about 2.5 wt. %. In an embodiment, the total amount active component is present in an amount from about 0.05 wt. % to about 15 wt. %, or from about 0.5 wt. % to about 6 wt. %, or from about 1 wt. % to about 2.5 wt. %, or from about 2 wt. % to about 2.5 wt. %, wherein all weight percentages are percent by weight of the total composition. In an embodiment, the total amount active component is present in an amount from about 2 wt. % to about 2.5 wt. % wherein all weight percentages are percent by weight of the total composition. In an embodiment, the total amount active component is present in an amount of about 2.3 wt. % based on the total weight of the total composition.

Essential Oils. The pest control composition according to an embodiment of the present disclosure, is a composition that includes essential oils—e.g., at least one mint oil (e.g., spearmint oil, peppermint oil, and/or cornmint oil). In certain embodiments, the pest control composition includes essential oils of spearmint and rosemary.

Particular strains of certain essential oils may be especially well-suited for use in certain insecticidal or insect repellent formulations. Additionally, the essential oils help provide a synergistic effect when combined. In particular embodiments, the insecticidal or insect repellent formulations include at least one mint oil (e.g., spearmint oil, peppermint oil, cornmint oil) and at least one rosemary oil. Even further, the essential oils may provide an aromatic effect or pleasant fragrance to the applied area.

Spearmint oil. For the purposes of this disclosure, as used herein, "spearmint oil" may refer to both extracted and synthetic versions of *Mentha spicata, Mentha crispa, Mentha* crispate, *Mentha cardiaca* G. (scotch spearmint), *Mentha spicata* L. var. *crispa* (Bentham) Danert (native spearmint), and/or *Mentha viridis*, and derivatives thereof. Spearmint is also known as garden mint, common mint, lamb mint, and mackerel mint. Further, spearmint oil includes a CAS registry number of 8008-79-5. Spearmint may also be a species of mint and may be native to Europe and southern temperate Asia, extending from Ireland in the west to southern China in the east. In addition, spearmint oil has at least one of the following constituents: carvone, d-limonene, (Z)-Dihydrocarvone, menthone, 3-myrcene, α-pinene, camphene, sabinene, 3-pinene, myrcene, 3-octanol, p-cymene, 1,8-cineole, (Z)-β-ocimene, cis-sabinene hydrate, linalool, ci s-p-menth-2-en-1-ol, cis-limonene oxide, trans-limonene oxide, borneol, δ-terpineol, 4-terpineol, α-terpineol, dihydrocarveol, cis-dihydrocarvone, trans-carveol, cis-carveol, pulegone, isobornyl acetate, iso-dihydrocarveol acetate, β-bourbonene, β-elemene, 3-caryophyllene, germacrene D, germacrene A, spathulenol, caryophyllene oxide, monoterpene hydrocarbons, oxygenated monoterpenes, sesquiterpene hydrocarbons, and/or oxygenated sesquiterpenes. In particular embodiments, the spearmint oil may have the following major constituents: carvone, limonene, (Z)-Dihydrocarvone, 3-octanol, menthone, 1,8-cineole, and β-myrcene.

Peppermint oil. For the purposes of this disclosure, as used herein, "peppermint oil" may refer to both extracted and synthetic versions of *Mentha balsamea* Wild, *Mentha x piperita* L., and derivatives thereof. Peppermint can also be a hybrid mint—a cross between watermint and spearmint. Further, peppermint oil has the CAS registry number 8006-90-4, and may have at least one of the following constituents: menthol, menthone, menthyl acetate, 1,8-cineol, menthofuranne, neomenthol, isomenthone, beta-caryophyllene, germacrene D, limonene, 3-pinene, terpinene-4-ol, α-pinene, (6R)-(+)-Menthofuran tr, terpinen-4-ol, (1R)-(+)-3-pulegone, germacrene, β-caryophyllene, (E)-sabinene hydrate, piperitone, and/or isomenthol. In particular embodiments, peppermint oil includes the following major constituents: menthol, menthone, menthyl acetate, neomenthol, 1,8-cineole, (6R)-(+)-Menthofuran, isomenthone, terpinen-4-ol, (1R)-(+)-β-Pulegone, limonene, germacrene D, 3-caryophyllene, (E)-Sabinene hydrate, 3-pinene, piperitone, and isomenthol Cornmint oil. As used herein, "cornmint oil" may refer to both extracted and synthetic versions of *Mentha* arvensis, *Mentha arvensis* L., *Mentha arvensis* f. *piperascens* Malinv. Ex Holmes, *Mentha arvensis* L. var. *galbrata* Benth, *Mentha arvensis* L. var. *villosa* Benth, *Mentha canadensis* L., and derivatives thereof. Further, cornmint oil has a CAS registry number 68917-18-0. Cornmint is also known as field mint or wild mint. Further, like spearmint oil and peppermint oil, cornmint oil is a species of a flowering plant in the mint family Lamiaceae. Cornmint oil may also have at least one of the following constituents: cis-beta-ocimene, β-phellandrene, gamma-terpinene, terpinolene, α-pinene, neomenthol, santene, α-thujene, p-cymene, β-farnesene, β-caryophyllene, betabourbonene, myrcene, β-myrcene, α-terpinene, delta-terpinene, limonene, β-pinene, camphene, sabinene, germacrene D, gamma-caryophyllene, delta-cardinene, ethanol, 3-methylbutanol, 3-octanol, citronellolnerol, menthol, isomenthol, α-terpineol, isopulegol, cis-carveol, pmenthan-2,5-diol, isocaryophyllenol, butanol, (Z)-3-hexenol, 2,6-nonadienol, geraniol, neoisomenthol, terpinen-4-ol, neoiso(iso)pulegol, trans-carveol, borneol, viridiflorol, acetaldehyde, 3-methylbutanal, geranial, 2-methylpropanal, 2,6-nonadienal, neral, acetone, 2-heptanone, 2-isopropylcyclopentanone, 3-methylcyclohexanone, menthone, piperitone, carvone, 2-butanone, methylheptenone, cis-jasmone, carvomenthone, isomenthone, pulegone, (1R)-(+)-β-pulegone, iso-isopulegol, formic acid, 3-methylbutanoic acid, hexanoic acid, nonanoic acid, acetic acid, pentanoic acid, (E)-2-hexenyl acetate, (Z)-3-hexenyl acetate, 1-octen-3-yl acetate, geranyl acetate, linalyl acetate, menthyl acetate, isomenthyl acetate, neomenthyl acetate, neoisomenthyl acetate, dihydrocarvyl acetate, (Z)-3-hexenyl 3-methylbutanoate, menthyl 3-methylbutanoate, menthyl pentanoate, (Z)-3-hexenyl hexanoate, menthyl hexanoate, (Z)-3-hexenyl 2-hydroxybenzoate, (E)-2-hexenyl phenylacetate, (Z)-3-hexenyl phenylacetate, 3-phenylpyridine, 3-phenyl-4-propylpyridine, menthofuran, menthofurolactone, 1,8-cineole, trans-2,5-diethylfuran, 3-(5,5-dimethyltetrahydro-2-furyl)-(Z)-2-butenol-1, piperitone oxide, beta-caryophyllene oxide, and/or 2-isopropyl-5-methylphenol (thymol). In particular embodiments, cornmint oil may include at least the following major constituents: menthol and menthone.

In certain embodiments, the pest control composition includes between about 0.1% to about 11% by weight of mint oil, based on the total weight of the composition. In some embodiments, the pest control composition includes between about 0.2% to about 10% by weight of mint oil, based on the total weight of the composition. In other embodiments, the pest control composition includes between about 0.3% to about 9% by weight of mint oil, based on the total weight of the composition. In further embodiments, the pest control composition includes between about 0.4% to about 8% by weight of mint oil, based on the total weight of the composition. In even further embodiments, the pest control composition includes between about 0.5% to about 7% by weight of mint oil, based on the total weight of the composition. In some embodiments, the pest control composition includes between about 0.7% to about 6% by weight of mint oil, based on the total weight of the composition. In other embodiments, the pest control composition includes between about 0.9% to about 5% by weight of mint oil, based on the total weight of the composition. In further embodiments, the pest control composition includes between about 1.1% to about 4% by weight of mint oil, based on the total weight of the composition. In other embodiments, the pest control composition includes between about 1.2% to about 3% by weight of mint oil, based on the total weight of the composition. In certain embodiments, the pest control composition includes between about 1% to about 2% by weight of mint oil, based on the total weight of the composition. In accordance with an exemplary embodiment, the mint oil is present in an amount of about 1.50% by weight of the total composition. While specific values chosen for this embodiment are recited, it is to be understood that, within the scope of the disclosure, the concentrations of the mint oil may vary to suit different applications. The concentration ranges of mint oil will vary based on the additional components of the pest control composition, including, but not limited to, the rosemary oil.

In other embodiments, the composition includes between about 5% to about 50% by weight of mint oil, based on the total weight of the composition. In further embodiments, the composition for repelling insects includes between about 10% to about 45% by weight of mint oil, based on the total weight of the composition. In other embodiments, the composition for repelling insects includes between about 15% to about 40% by weight of mint oil, based on the total weight of the composition. In other embodiments, the composition for repelling insects includes between about 15% to about 35% by weight of mint oil, based on the total weight of the composition. In further embodiments, the composition for repelling insects includes between about 20% to about 35% by weight of mint oil, based on the total weight of the composition. In even further embodiments, the composition for repelling insects includes between about 25% to about 33% by weight of mint oil, based on the total weight of the composition. In an exemplary embodiment, the composition comprises about 32.5% of mint oil, based on the total weight of the composition. While specific values chosen for this embodiment are recited, it is to be understood that, within the scope of the disclosure, the concentration of the mint oil may vary to suit different applications. The concentration ranges of the mint oil will vary based on the additional components of the repellent composition, including, but not limited to, the rosemary oil.

Rosemary oil. As used herein, "rosemary oil" may refer to both extracted and synthetic versions of *Rosmarinus officinalis, Limonium vulgare, Andromeda polifolia*, and derivatives thereof. Further, rosemary oil includes a CAS registry number of 8000-25-7, and includes at least one of the following constituents: tricyclene, alpha-thujene, alpha-pinene, camphene, sabinene, beta-pinene, myrcene, alpha-phellandrene, car-3-ene, alpha-terpinolene, p-cymene, 1,8-cineole, limonene, gamma-terpinene, trans-sabinene, terpinolene, linalool, alpha-campholenol, endo-fenchol, and/or camphor. In particular embodiments, rosemary oil may include the following major constituents: 1,8-cineole, borneol, camphor, verbenone, α-pinene, bornyl acetate, linalool, camphene, β-caryophyllene, α-terpineol, p-cymene, ar-curcumene, 1-nonanol, and terpinen-4-ol.

In certain embodiments, the pest control composition includes between about 0.05% to about 5% by weight of rosemary oil, based on the total weight of the composition, or between about 0.05% to about 4.5% by weight, based on the total weight of the composition. In other embodiments, the pest control composition includes between about 0.1% to about 4.5% by weight of rosemary oil, based on the total weight of the composition. In particular embodiments, the pest control composition includes between about 0.2% to about 4% by weight of rosemary oil, based on the total weight of the composition. In some embodiments, the pest control composition includes between about 0.3% to about 3.5% by weight of rosemary oil, based on the total weight of the composition. In other embodiments, the pest control composition includes between about 0.4% to about 3% by weight of rosemary oil, based on the total weight of the composition. In further embodiments, the pest control composition includes between about 0.5% to about 4.5% by weight of rosemary oil, based on the total weight of the composition. In even further embodiments, the pest control composition includes between about 0.5% to about 2.5% by weight of rosemary oil, based on the total weight of the composition. In other embodiments, the pest control composition includes between about 0.5% to about 2% by weight of rosemary oil, based on the total weight of the composition. In some other embodiments, the pest control composition includes between about 0.5% to about 1.5% by weight of rosemary oil, based on the total weight of the composition. In further embodiments, the pest control composition includes between about 0.5% to about 1.2% by weight of rosemary oil, based on the total weight of the composition. In certain embodiments, the pest control composition includes between about 0.6% to about 1% by weight of rosemary oil, based on the total weight of the composition. In other embodiments, the pest control composition includes between about 0.7% to about 0.9% by weight of rosemary oil, based on the total weight of the composition. In accordance with an exemplary embodiment, the rosemary oil is present in an amount of about 0.82% by weight of the total composition. While specific values chosen for this embodiment are recited, it is to be understood that, within the scope of the disclosure, the concentrations of the rosemary oil may vary to suit different applications. The concentration ranges of rosemary oil will vary based on the additional components of the pest control composition, including, but not limited to, the mint oil.

In other embodiments, the composition for repelling insects includes between about 5% to about 50% by weight of rosemary oil, based on the total weight of the composition. In certain embodiments, the composition for repelling insects includes between about 7% to about 45% by weight of rosemary oil, based on the total weight of the composition. In further embodiments, the composition for repelling insects includes between about 9% to about 40% by weight of rosemary oil, based on the total weight of the composition. In even further embodiments, the composition for repelling insects includes between about 11% to about 35% by weight of rosemary oil, based on the total weight of the composition, or between about 15% to about 35% by weight, based on the total weight of the composition. In some embodiments, the composition for repelling insects includes between about 13% to about 30% by weight of rosemary oil, based on the total weight of the composition. In other embodiments, the composition for repelling insects includes between about 10% to about 25% by weight of rosemary oil, based on the total weight of the composition. In further embodiments, the composition for repelling insects includes between about 15% to about 25% by weight of rosemary oil, based on the total weight of the composition. In certain embodiments, the composition for repelling insects includes between about 17% to about 20% by weight of rosemary oil, based on the total weight of the composition. In an exemplary embodiment, the composition includes about 17.5% of rosemary oil, based on the total weight of the composition. While specific values chosen for this embodiment are recited, it is to be understood that, within the scope of the disclosure, the concentration of the rosemary oil may vary to suit different applications. The concentration ranges of the rosemary oil will vary based on the additional components of the repellent composition, including, but not limited to, the mint oil.

In certain embodiments, the pest control composition comprises (i) mint oil selected from the group consisting of spearmint oil, peppermint oil, and cornmint oil, and (ii) rosemary oil. In the present disclosure, Applicant demonstrates that a combination of mint and rosemary essential oils unexpectedly provides a pleasant smell, a low linger scent, and a high efficacy of killing/repelling insects. In certain embodiments, the mint oil is spearmint oil. In other embodiments, the mint oil is peppermint oil. In other embodiments, the mint oil is cornmint oil. In some embodiments, the mint oil is higher in weight percent in the composition than the rosemary oil. In further embodiments, the mint oil and the rosemary oil have a weight ratio of from about 1:1 to about 3:1. In particular embodiments, the mint oil and the rosemary oil have a weight ratio of from about 1.1:1 to about 2.8:1. In further embodiments, the mint oil and the rosemary oil have a weight ratio of from about 1.2:1 to about 2.6:1. In even further embodiments, the mint oil and the rosemary oil have a weight ratio of from about 1.3:1 to about 2.4:1. In other embodiments, the mint oil and the rosemary oil have a weight ratio of from about 1.5:1 to about 2.2:1. In some embodiments, the mint oil and the rosemary oil have a weight ratio of from about 1.6:1 to about 2:1. In further embodiments, the mint oil and the rosemary oil have a weight ratio of from about 1.7:1 to about 1.9:1. In accordance with an exemplary embodiment, the mint oil and the rosemary oil have a weight ratio of about 1.8:1. While specific ratios chosen for this embodiment are recited, it is to be understood that, within the scope of the disclosure, the ratios of the mint oil and the rosemary oil may vary to suit different applications.

Other plant-based pest control natural oils or natural oil extracts or natural oil fractions that may be contained in the embodiments of compositions for killing insects and/or repelling insects described herein may comprise, by way of example only and are not limited to, neem oil, karanja oil, clove oil, thyme oil, oregano oil, garlic oil, anise oil, lime oil, lavender oil, thymol (found in oregano oil and thyme oil, for example), p-cymene (found in oregano oil and thyme oil, for example), 1,8-cineole (found in thyme oil and peppermint oil, for example), eugenol (found in clove oil and cinnamon oil, for example), limonene (found in cinnamon, peppermint, and lime oil, for example), alpha-pinene (found in cinnamon oil, geranium oil, and lime oil, for example), carvacrol (found in oregano oil, thyme oil, and clove oil, for example), gamma-terpinene (found in oregano oil and lime oil, for example), geraniol (found in thyme oil and geranium oil, for example), alpha-Terpineol (found in thyme oil and anise oil, for example), beta-caryophyllene (found in clove oil, cinnamon oil, and peppermint oil, for example) and linalool (found in thyme oil, cinnamon oil and geranium oil, amongst others), or mixtures thereof. In other embodiments, the insecticidal natural oil may comprise any oil having as a constituent one of the following compounds, or a combination of the following compounds: azadirachtin, nimbin, nimbinin, salannin, gedunin, geraniol, geranial, gamma-terpinene, alpha-terpin-eol, beta-caryophyllene, terpinen-4-ol, myrcenol-8, thuya-nol-4, benzyl alcohol, cinnamaldehyde, cinnamyl acetate, alpha-pinene, geranyl acetate, citronellol, citronellyl formate, isomenthone, 10-epi-gamma-eudesmol, 1,5-dimethyl-1-vinyl-4-hexenylbutyrate, 1,3,7-octatriene, eucalyptol, camphor, diallyl disulfide, methyl allyl trisulfide, 3-vinyl-4H-1,2 dithiin, 3-vinyl-1,2 dithiole-5-cyclohexane, diallyl trisulfide, anethole, methyl chavicol, anisaldehyde, estragole, linalyl acetate, geranial, beta-pinene, thymol, carvacrol, p-cymene, beta-myrcene, alpha-myrcene, 1,8-cin-eole, eugenol, limonene, alpha-pinene, menthol, menthone, linalool, their constituents, if applicable, or mixtures thereof.

In further embodiments, other plant-based essential oils, or extracts, or constituents, or fractions thereof that may be contained in the embodiments of compositions for killing insects and/or repelling insects described herein may comprise alpha- or beta-pinene; alpha-camp-holenic aldehyde; alpha-citronellol; alpha-iso-amyl-cinnamic (e.g., amyl cinnamic aldehyde); alpha-pinene oxide; alpha-cinnamic terpinene; alpha-terpineol (e.g., 1-methyl-4-isopropyl-1-cyclohexen-8-ol); lamda-terpinene; achillea; aldehyde C16 (pure); allicin; alpha-phellandrene; amyl cinnamic aldehyde; amyl salicylate; anethole; anise; aniseed; anisic aldehyde; basil; bay; benzyl acetate; benzyl alcohol; bergamot (e.g., *Monardia fistulosa, Monarda didyma, Citrus bergamia, Monarda punctata*); bitter orange peel; black pepper; borneol; calamus; camphor; *cananga* oil (e.g., java); cardamom; carnation (e.g., dianthus caryophyllus); carvacrol; carveol; *cassia*; castor; cedar (e.g., hinoki); chamomile; cineole; cinnamaldehyde; cinnamic alcohol; cis-pinane; citral (e.g., 3,7-dimethyl-2,6-octadienal); citronella; citronellal; citronellol dextro (e.g., 3-7-dimethyl-6-octen-1-ol); citronellol; citronellyl acetate; citronellyl nitrile; *citrus unshiu*; clary sage; clove (e.g., eugenia caryophyllus); clove bud; coriander; corn; cotton seed; d-dihydrocarvone; decyl aldehyde; diallyl disulfide; diethyl phthalate; dihydroanethole; dihydrocarveol; dihydrolinalool; dihydromyrcene; dihydromyrcenol; dihydromyrcenyl acetate; dihydroterpineol; dimethyl salicylate; dimethyloctanal; dimethyloctanol; dimethyloctanyl acetate; diphenyl oxide; dipropylene glycol; d-limonene; d-pulegone; estragole; ethyl vanillin (e.g., 3-ethoxy-4-hydrobenzaldehyde); eucalyptol (e.g., cineole); *eucalyptus citriodora; eucalyptus globulus; eucalyptus*; eugenol (e.g., 2-methoxy-4-allyl phenol); evening primrose; fenchol; fennel; Femiol™ fish; florazon (e.g., 4-ethyl-.alpha., .alpha.-dimethyl-benzenepropanal); galaxolide; geraniol (e.g., 2-trans-3,7-dimethyl-2,6-octadien-8-ol); geraniol; geranyl acetate; geranyl nitrile; ginger; grapefruit; guaiacol; guaiacwood; gurjun balsam; heliotropin; herbanate (e.g., 3-(1-methyl-ethyl) bicyclo(2,2,1) hept-5-ene-2-carboxylic acid ethyl ester); hiba; hydroxycitronellal; i-carvone; i-methylacetate; ionone; isobutyl quinoleine (e.g., 6-secondary butyl quinoline); isobornyl acetate; isobornyl methylether; isoeugenol; isolongifolene; jasmine; jojoba; juniper berry; lavender; lavandin; lemon grass; lemon; lime; limonene; linallol oxide; linallol; linalyl acetate; linseed; *litsea cubeba*; I-methyl acetate; longifolene; mandarin; *mentha*; menthane hydroperoxide; menthol crystals; menthol laevo (e.g., 5-methyl-2-isopropyl cyclohexanol); menthol; menthone laevo (e.g., 4-isopropyl-1-methylcyclohexan-3-one); methyl anthranilate; methyl cedryl ketone; methyl chavicol; methyl hexyl ether; methyl ionone; mineral; mint; musk ambrette; musk ketone; musk xylol; mustard (also known as allylisothio-cyanate); myrcene; nerol; neryl acetate; nonyl aldehyde; nutmeg (e.g., *myristica fragrans*); orange (e.g., *Citrus aurantium dulcis*); orris (e.g., *Iris florentina*) root; para-cymene; para-hydroxy phenyl butanone crystals (e.g., 4-(4-hydroxphenyl)-2-butanone); passion palmarosa oil (e.g., Cymbopogon martini), patchouli (e.g., *Pogostemon cablin*), p-cymene; pennyroyal oil; pepper; peppermint (e.g., *Mentha piperita*), perillaldehyde; petitgrain (e.g., *Citrus aurantium amara*); phenyl ethyl alcohol; phenyl ethyl propionate; phenyl ethyl-2-methylbutyrate; pimento berry; pimento leaf; pinane hydroperoxide; pinanol; pine ester; pine needle; pine; pinene; piperonal; piperonyl acetate; piperonyl alcohol; plinol; plinyl acetate; pseudo ionone; rhodinol; rhodinyl acetate; rosalin; rose; ryu; sage; sandalwood (e.g., *Santa-lum album*), sandenol; *sassafras*; sesame; soybean; spice; spike lavender; spirantol; starflower; tangerine; tea seed; tea tree; terpenoid; terpineol; terpinolene; terpinyl acetate; tert-butylcyclohexyl acetate; tetrahydrolinalool; tetrahydrolinalyl acetate; tetrahydromyrcenol; thulasi; thyme; thymol; tomato; trans-2-hexenol; trans-anethole and metabolites thereof; turmeric; turpentine; vanillin (e.g., 4-hydroxy-3-methoxy benzaldehyde); vetiver; vitalizair; white cedar; white grapefruit; wintergreen (methyl salicylate) oils, or mixtures thereof.

Other suitable essential oils for use in the insecticidal and repellent compositions described herein include, but are not limited to, Absinth Oil, Almond Oil, Ambrette Seed Oil, Amyris Oil, Angelica Root Oil, Anethole 20/21 natural, Angelica Seed Oil, Aniseed Oil China star, Anise Star Oil, Balsam Fir Oil, Balsam Oil, Basil Oil, Bay Oil, Bergamot Oil, Birch Sweet Oil, Birch Tar Oil, Bitter Almond Oil, Bitter Orange Oil Cold Pressed, Black Pepper Oil Black Pepper Oleoresin 40/20, Bois de Rose, Buchu Oil, Cabreuva Oil, Cade Oil, Cajeput Oil, Calamus Oil, Camphor Oil White, *Cananga* Oil, *Capsicum* Oil, Caraway Seed Oil, Cardamom Seed Oil, Carrot Seed Oil, *Cassia* Oil, Cedar leaf Oil, Cedarwood Oil, Celery Leaf Oil, Celery Seed Oil, Chamomile Flower Oil, *Chenopodium* Oil (Wormseed), Cinnamon Bark Oil, Cinnamon Leaf Oil, Cistus Oil, Citronella Oil, Citronellol Terpenes, Clary Sage Oil, Clove Bud Oil, Clove Leaf Oil, Clove Stem Oil, Cognac Oil Green, Cognac Oil White, Copaiba Oil, Coriander Leaf Oil, Coriander Seed Oil, Cornmint Oil (*Mentha Arvensis*), Cumin Seed Oil, Cyclamen Oil, Cypress Oil, Davana Oil, Dill Herb Oil, Erigeron Oil, Estragon Oil (Tarragon Oil), *Eucalyptus* Oil, Fennel Oil Bitter, Fennel Oil Sweet, Fir Needle Oil, *Galbanum* Oil, Garlic Oil, Geranium Oil, Ginger Oil, Grapefruit Oil 10-Fold, Grapefruit Oil 5-Fold, Grapefruit Oil Cold Pressed, Grapefruit Oil Terpenes, Guaiac Wood Oil, Gurjun Balsam, Hemlock Oil (Spruce), Ho Leaf Oil, Ho Wood Oil, Hyssop Oil, Jasmin Oil, Juniper Berry Oil, Laurel Leaf Oil, Lavandin Oil, Lavender Oil, Lavender Spike Oil, Lemon Oil 10-Fold, Lemon Oil 5-Fold, Lemon Oil Cold Pressed, Lemon Oil Distilled, Lemon Oil Terpenes, Lemon Oil Washed, Lemongrass Oil, Lemongrass Oil Terpeneless, Lime Oil 5-Fold, Lime Oil Distilled, Lime Oil Terpenes, Lime Oil Washed, *Litsea Cubeba* Berry Oil, Mace Oil, Mandarin Oil Cold Pressed, Marjoram Oil Sweet, Musk Oil, Myrtel Oil, Neroli Oil, Nutmeg Oil, *Ocotea Cymbarum* Oil, Onion Oil, Orange Oil Bitter Cold Pressed, Orange Oil 10-Fold, Orange Oil 20-Fold, Orange Oil 5-Fold, Orange Oil Bitter 5-Fold, Orange Oil Cold Pressed, Orange Oil Terpeneless, Oregano Oil, *Origanum* Oil, Palmarosa Oil, Parsley Leaf Oil, Parsley Seed Oil, Patchouli Oil, Pennroyal Oil, Pepper Oil Black, Peppermint Oil, Petitgrain Oil, Pimenta Berry Oil, Pimenta Leaf Oil, Pine Needle Oil, Pine Oil Scotch, Pine Oil White, Rosalin Oil, Rose Oil, Sage Clary Oil, Sage Oil, Sandalwood Oil, *Sassafras* Oil, Savory Oil, Spike Lavender Oil (Lavender Spike), Spruce Oil (Hemlock), Star Anise Oil, *Styrax* Oil, *Tagetes* Oil, Tangelo Oil, Tangerine Oil, Tangerine Oil 5-Fold, Tangerine Oil Terpenes, Tarragon Oil (Estragon Oil), Tea Tree Oil, Thyme Oil, Thyme Oil White, Tumeric Oil, Purpentine Oil, Valerian Oil, Vanilla beans abs., Vetiver Oil, Wintergreen Oil (Methyl Salicylate Natural), Wormseed Oil, Wormwood Oil, and Ylang Ylang Oil.

In certain circumstances, the composition may include one or more ingredients eligible for minimum risk pesticide products that are exempt from the Federal Insecticide, Fungicide, and Rodenticide Act (FIFRA) under the Minimum Risk Exemption regulations in 40 U.S. Code of Federal Regulations 152.25(f), for example, included, but not limited to, those listed as "Active Ingredients Permitted in Exempted Minimum Risk Pesticide Products" in 40 U.S. Code of Federal Regulations 152.25(f). Included in this list is sodium lauryl sulfate, which may be considered, under certain circumstances, to serve as an active ingredient.

The compositions of the present disclosure, and the active component thereof, may also include other active ingredients other than, or in addition to, essential oils.

In certain embodiments, the composition includes about 0.1% to about 4% by weight of an additional active ingredient, based on the total weight of the composition. In some embodiments, the composition includes about 0.4% to about 3.9% by weight of the additional active ingredient, based on the total weight of the composition. In other embodiments, the composition includes about 0.8% to about 3.8% by weight of the additional active ingredient, based on the total weight of the composition. In further embodiments, the composition includes about 1.25% to about 3.7% by weight of the additional active ingredient, based on the total weight of the composition. In even further embodiments, however, the composition is substantially free of another active ingredient. While specific values chosen for this embodiment are recited, it is to be understood that, within the scope of the disclosure, the concentration of additional active ingredient may vary to suit different applications.

The compositions of the present disclosure may also include one or more other components. In certain embodiments, for example, the compositions of the present disclosure may include at least one of a carrier, a solvent, a dehydrate, and/or a propellant.

Carrier. The term "carrier" as used herein means a material, which can be inorganic or organic and of synthetic or natural origin, with which the active compound is mixed or formulated to facilitate its application to the host, area, or other object to be treated, or to facilitate its storage, transport and/or handling. In general, any of the materials customarily employed in formulating repellents, pesticides, herbicides, or fungicides, are suitable.

The pest control composition according to an embodiment of the present disclosure is a composition including at least one mint oil (e.g., spearmint oil, peppermint oil, and/or cornmint oil), rosemary oil, and a carrier. In certain embodiments, the carrier is mineral oil. Further, in particular embodiments of the present disclosure, the composition is substantially or completely free of water. In further embodiments, the carrier consists essentially of a hydrocarbon solvent, and in even further embodiments, the solvent consists of a hydrocarbon solvent.

In certain embodiments, the composition includes a carrier. In some embodiments, the carrier includes a hydrocarbon solvent. In certain embodiments, the hydrocarbon solvent includes at least one of aliphatic $C_9$-$C_{14}$ hydrocarbons, alicyclic $C_9$-$C_{14}$ hydrocarbons, naphtha, petroleum distillate, paraffins, iso-paraffins, isoparaffinic hydrocarbons, cycloparaffins, alkanes, iso-alkanes, cycloalkanes, and any combinations thereof. In certain embodiments, the carrier is selected from the group consisting of aliphatic $C_9$-$C_{14}$ hydrocarbons, alicyclic $C_9$-$C_{14}$ hydrocarbons, naphtha, petroleum distillate, paraffins, iso-paraffins, isoparaffinic hydrocarbons, cycloparaffins, alkanes, iso-alkanes, cycloalkanes, and any combinations thereof. In particular embodiments, the carrier is mineral oil. In certain embodiments, the carrier is white mineral oil. In further embodiments, the composition includes about 60% to about 90% by weight carrier, based on the total weight of the composition. In other embodiments, the composition includes about 63% to about 87% by weight carrier, based on the total weight of the composition. In particular embodiments, the composition includes about 65% to about 85% by weight carrier, based on the total weight of the composition. In even further embodiments, the composition includes about 70% to about 83% by weight carrier, based on the total weight of the composition. In some embodiments, the composition includes about 75% to about 80% by weight carrier, based on the total weight of the composition. While specific values chosen for this embodiment are recited, it is to be understood that, within the scope of the disclosure, the amount of carrier may vary to suit different applications. The amount ranges of carrier will vary based on the additional components of the pest control composition, including, but not limited to, the mint oil and the rosemary oil.

Solvent. The formulation or composition of the present disclosure may also include a solvent, for example to dissolve certain components, to enhance functionality of the components, or for textural and sensorial attributes. In some embodiments, the solvent includes at least one of ethyl lactate, butyl lactate, isopropyl alcohol, isopropyl myristate, and/or combinations thereof.

In certain embodiments, the composition includes a solvent. In these embodiments, the solvent may include at least one of ethyl lactate, butyl lactate, isopropyl alcohol, propylene carbonate, and any combinations thereof. In some embodiments, the composition includes about 1% to about 20% by weight of the solvent, and in some other embodiments, the composition includes about 1% to about 18% by weight of the solvent, based on the total weight of the composition. In further embodiments, the composition includes about 1% to about 10% by weight of the solvent, based on the total weight of the composition. In other embodiments, the composition includes a solvent present in about 3% to about 10% by weight, based on the total weight of the composition, or between about 2% to about 9% by weight of the solvent, based on the total weight of the composition. In further embodiments, the composition includes about 3% to about 8% by weight of the solvent, based on the total weight of the composition. In particular embodiments, the composition includes about 4% to about 9% by weight, based on the total weight of the composition, or about 4% to about 7% by weight of the solvent, based on the total weight of the composition, or between about 6% to about 8% by weight, based on the total weight of the composition.

In even further embodiments, the solvent is present in an amount from about 45% to about 55% by weight, based on the total weight of the composition. In another embodiment, the solvent is present in about 48% to about 52% by weight, based on the total weight of the composition. In yet another embodiment, the solvent is present in about 50% by weight, based on the total weight of the composition. While specific values chosen for this embodiment are recited, it is to be understood that, within the scope of the disclosure, the concentration of solvent may vary to suit different applications. The concentration ranges of solvent will vary based on the additional components of the pest control composition, including, but not limited to, the mint oil and the rosemary oil.

Additionally, according to one embodiment, the solvent includes at least one of ethyl lactate, butyl lactate, isopropyl alcohol, and combinations thereof. For example, in an embodiment, the solvent includes at least one of ethyl lactate, isopropyl alcohol, and combinations thereof. In another embodiment, the solvent includes at least one of ethyl lactate, butyl lactate, and combinations thereof. In an even further embodiment, the solvent is selected from the group consisting of ethyl lactate, butyl lactate, isopropyl alcohol, isopropyl myristate, and combinations thereof.

Further, in an embodiment, the solvent includes ethyl lactate. In this embodiment, the composition includes about 3% to about 15% by weight ethyl lactate, based on the total weight of the composition. In further embodiments, the composition includes about 6% to about 7% by weight ethyl lactate, based on the total weight of the composition. In even further embodiments, the composition includes about 6.4% to about 6.9% by weight ethyl lactate, based on the total weight of the composition. In even further embodiments, the composition includes about 45% to about 55% by weight ethyl lactate, based on the total weight of the composition. In other embodiments, however, the composition is substantially free of ethyl lactate. While specific values chosen for this embodiment are recited, it is to be understood that, within the scope of the disclosure, the concentration of ethyl lactate may vary to suit different applications. The concentration ranges of ethyl lactate, for example, will vary based on the additional components of the pest control composition, such as the spearmint oil, the rosemary oil, and the carrier.

According to further embodiments of the present disclosure, the solvent may also include butyl lactate, and in one embodiment, the solvent is butyl lactate. In certain embodiments, the composition includes about 3% to about 15% by weight butyl lactate, based on the total weight of the composition. In further embodiments, the composition includes about 6% to about 7% by weight butyl lactate, based on the total weight of the composition. In certain embodiments, the composition includes about 6.4% to about 6.9% by weight butyl lactate, based on the total weight of the composition. In even further embodiments, the butyl lactate is present in an amount from about 45% to about 55% by weight, based on the total weight of the composition. In certain embodiments, however, the composition is substantially free of butyl lactate. While specific values chosen for this embodiment are recited, it is to be understood that, within the scope of the disclosure, the concentration of butyl lactate may vary to suit different applications. The concentration ranges of butyl lactate will vary based on the additional components of the pest control composition, such as the spearmint oil, the rosemary oil, and the carrier.

According to embodiments of the present disclosure, the solvent may also include isopropyl alcohol. In certain embodiments, the solvent is isopropyl alcohol. In some embodiments, the composition includes about 3% to about 15% by weight isopropyl alcohol. In further embodiments, the composition includes about 6% to about 7% by weight isopropyl alcohol. In even further embodiments, the composition includes about 6.4% to about 6.9% by weight isopropyl alcohol. In other embodiments, however, the composition is substantially free of isopropyl alcohol. In even further embodiments, the composition includes isopropyl alcohol present in an amount from about 45% to about 55% by weight, based on the total weight of the composition. While specific values chosen for this embodiment are recited, it is to be understood that, within the scope of the disclosure, the concentration of isopropyl alcohol may vary to suit different applications. The concentration ranges of isopropyl alcohol will vary based on the additional components of the pest control composition, such as the spearmint oil, the rosemary oil, and the carrier.

In even further embodiments, the solvent may include propylene carbonate. In these embodiments, the composition includes about 3% to about 15% by weight propylene carbonate. In further embodiments, the composition includes about 6% to about 7% by weight propylene carbonate. In even further embodiments, the composition includes about 6.4% to about 6.9% by weight propylene carbonate. In other embodiments, however, the composition is substantially free of propylene carbonate. In even further embodiments, the composition includes propylene carbonate present in an amount from about 45% to about 55% by weight, based on the total weight of the composition. While specific values chosen for this embodiment are recited, it is to be understood that, within the scope of the disclosure, the concentration of propylene carbonate may vary to suit different applications. The concentration ranges of propylene carbonate will vary based on the additional components of the pest control composition, such as the spearmint oil, the rosemary oil, and the carrier.

Dehydrate. In certain embodiments, the composition also includes a dehydrate, and in one embodiment, the dehydrate is isopropyl myristate. The term "dehydrate" as used herein means a desiccant or dehydrating material, which can be inorganic or organic and of synthetic or natural origin, with which the active compound is mixed or formulated to facilitate its application to the host, area, or other object to be treated, or to facilitate insecticidal activity by dehydration of the insects. In general, any of the materials customarily employed in formulating repellents, pesticides, herbicides, or fungicides, are suitable. In these embodiments, the composition may include about 1% to about 15% by weight dehydrate, based on the total weight of the composition. In additional embodiments, the dehydrate is present in about 8% to about 15% by weight, based on the total weight of the composition, about 9% to about 13% by weight, based on the total weight of the composition, or about 10% to about 12% by weight, based on the total weight of the composition. In other embodiments, the composition includes about 3% to about 14% by weight dehydrate, based on the total weight of the composition. In further embodiments, the composition includes about 5% to about 13% by weight dehydrate, based on the total weight of the composition. In some embodiments, the composition includes about 8% to about 12% by weight dehydrate, based on the total weight of the composition. In even further embodiments, the dehydrate is isopropyl myristate. While specific values chosen for this embodiment are recited, it is to be understood that, within the scope of the disclosure, the concentration of dehydrate may vary to suit different applications. The concentration ranges of dehydrate will vary based on the additional components of the pest control composition, including, but not limited to, the mint oil and the rosemary oil.

In some embodiments, the composition includes about 1% to about 15% by weight isopropyl myristate, based on the total weight of the composition. In other embodiments, the composition includes about 3% to about 14% by weight isopropyl myristate, based on the total weight of the composition. In other embodiments, the composition includes about 5% to about 13% by weight isopropyl myristate, based on the total weight of the composition. In further embodiments, the composition includes about 8% to about 12% by weight isopropyl myristate, based on the total weight of the composition. While specific values chosen for this embodiment are recited, it is to be understood that, within the scope of the disclosure, the concentration of isopropyl myristate may vary to suit different applications. The concentration ranges of isopropyl myristate will vary based on the additional components of the pest control composition, including, but not limited to, the mint oil and the rosemary oil.

Propellant. According to embodiments of the present disclosure, the composition may also include a propellant, for example to provide a force to expel the formulation from the container. Here, the insecticidally-active compositions of the present disclosure may be combined with a suitable propellant to form an aerosol formulation. In certain embodiments, the composition includes a propellant. However, in other embodiments, the composition does not include a propellant and may be dispensed from a container manually, such as from a trigger-actuated container. In some embodiments, the propellant includes at least one of methane, ethane, propane, pentane, isobutene, n-butane, isobutane, dimethyl ether, 1,1-difluoroethane, 1,1,1,2-tetrafluoroethane, carbon dioxide, nitrogen, air, and any combinations thereof. In some embodiments, the propellant is selected from the group consisting of methane, ethane, propane, pentane, isobutene, n-butane, isobutane, dimethyl ether, 1,1-difluoroethane, 1,1,1,2-tetrafluoroethane, carbon dioxide, nitrogen, air, and any combinations thereof. Examples of suitable propellants include compressed gas propellants such as nitrogen, carbon dioxide, and nitrous oxide; liquefied gas propellants such as fluorinated and chlorinated hydrocarbons, dimethyl ether, vinyl chloride; saturated hydrocarbons or lower ($C_1$-$C_4$) aliphatic hydrocarbons, such as propane, butane, isobutane, isopentane, and mixtures thereof; and mixtures of liquefied gases and compressed gases. In order to reduce environmental pollution, it may be preferred to employ compressed gases as the propellant rather than, or in the place of, liquefied saturated hydrocarbons.

In additional embodiments, the composition includes about 1% to about 5% by weight the propellant, based on the total weight of the composition. In further embodiments, the composition includes about 1.5% to about 4.5% by weight the propellant, based on the total weight of the composition. In even further embodiments, the composition includes about 2% to about 4% by weight the propellant, based on the total weight of the composition. In other embodiments, the composition includes about 2.5% to about 3.5% by weight the propellant, based on the total weight of the composition. In some embodiments, the composition includes about 2.7% to about 3% by weight the propellant, based on the total weight of the composition. While specific values chosen for this embodiment are recited, it is to be understood that, within the scope of the disclosure, the concentration of propellant may vary to suit different applications. The concentration ranges of propellant will vary based on the additional components of the pest control composition, including, but not limited to, the mint oil and the rosemary oil.

The pest control composition according to an embodiment of the present disclosure is a composition including spearmint oil, rosemary oil, a carrier, and a propellant.

In certain embodiments, the composition includes about 1% to about 5% by weight of the propellant, based on the total weight of the composition. In certain embodiments, the composition includes about 1.5% to about 4.5% by weight of the propellant, based on the total weight of the composition. In some embodiments, the composition includes about 2% to about 4% by weight of the propellant, based on the total weight of the composition. In further embodiments, the composition includes about 2.5% to about 3.5% by weight of the propellant, based on the total weight of the composition. In even further embodiments, the composition includes about 2.7% to about 3% by weight of the propellant, based on the total weight of the composition. In other embodiments, however, the composition is substantially free of a propellant. While specific values chosen for this embodiment are recited, it is to be understood that, within the scope of the disclosure, the concentration of propellant may vary to suit different applications. The concentration ranges of propellant will vary based on the additional components of the pest control composition, such as the spearmint oil, the rosemary oil, and the carrier. In other embodiments, the hydrocarbon propellant may be present in the compositions of this disclosure in an amount of from about 8% to about 50%, from about 15% to about 50%, from about 15% to about 40%, from about 15% to about 25%, or from about 5% to about 30% by weight, based on the total weight of the composition.

Another embodiment of the pest control composition disclosed herein includes a method of killing insects comprising applying to a surface in need thereof a composition comprising at least one of mint oil selected from the group consisting of spearmint oil, peppermint oil, cornmint oil, and mixtures thereof, and rosemary oil.

Any of the embodiments described herein may be modified to include any of the structures, compositions, or methodologies disclosed herein in connection with different embodiments.

EXAMPLES

The following Examples are provided to demonstrate and further illustrate certain embodiments and aspects of the present disclosure and are not to be construed as limiting the scope of the disclosure.

In certain embodiments, as will be illustrated through the Examples, the pest control composition provides a pest mortality rate of about 100% in 24 hours, and in some embodiments, the pest control composition provides a pest knockdown rate of about 90% in 30 seconds. In some embodiments, the pest control composition provides a pest mortality rate of at least 96%, at least 97%, at least 98%, at least 99%, or at least 100% in 24 hours for at least the American cockroach, German cockroach, Argentine ant, and Pharaoh ant. Further, in some embodiments, the pest control composition provides a pest knockdown rate of at least 90%, at least 92%, at least 94%, at least 96%, at least 98%, at least 99%, or at least 100% in 30 seconds for at least the German cockroach, Argentine ant, and Pharaoh ant.

Unless stated otherwise, the efficacy tests were conducted in accordance with the U.S. Environmental Protection Agency Product Performance Test Guidelines, OCSPP 810.3500: Premises Treatments, which provides recommendations for the design and execution of laboratory and field studies to evaluate the performance of pesticide products applied in or around premises in connection with registration of pesticide products under the Federal Insecticide, Fungicide, and Rodenticide Act (FIFRA) (7 U.S.C. 136, et seq.). The entire contents of these testing guidelines are incorporated by reference herein.

In general, the following data was recorded for each sample set: sample group size, genus species, sex, maturity, and general condition. The number of insects knocked down after thirty seconds and number of insects dead after twenty-four hours post treatment were also recorded. The conditions of the testing area (temperature, humidity, date, and time) were also clearly associated with each testing round of samples and control. Additionally, the knockdown and mortality results were reported in both number relative to sample size and as a percentage of the sample size.

For crawling insects, the formulations were tested by treating the insects (e.g., cockroaches, Blattella germanica, Periplaneta americana, ants, Linepithema humile, Monomorium pharaonis) on a large platform with clean craft paper placed on its surface. A large "arena" ring was placed on top of the paper, with a smaller treatment ring in the center, placed on top of a sheet of vinyl flooring. Twenty seconds after treatment the smaller treatment ring was removed. Knockdown observations were taken either thirty seconds or two minutes after application of formulation to the insects. Approximately two minutes post treatment, insects were collected from the arena and placed into clean holding containers for twenty-four-hour mortality observations. A group of untreated insects were also held in clean containers for twenty-four-hour mortality observations as a control to the treated test system.

Example 1

Several formulations according to embodiments of the present disclosure were tested and efficacy data, including knockdown and mortality data, was collected for the formulations.

First, the following ingredients in Table 1 were used to prepare Formulations A and B.

Formulations A and B are oil-based insecticidal formulations and comprise about 1.5% mint oil; about 0.82% rosemary oil; about 76% to about 80% carrier; about 11.1% isopropyl myristate; about 6.9% solvent; and about 2.9% of an optional propellant.

TABLE 1

Components of Formulations A and B.

| Ingredient | Formulation A (wt. %) | Formulation B (wt. %) |
|---|---|---|
| Spearmint or peppermint or cornmint oil | 1.50% | 1.50% |
| Rosemary oil | 0.82% | 0.82% |
| White mineral oil | 76.82% | 79.67% |
| Isopropyl myristate | 11.08% | 11.08% |
| Ethyl lactate or butyl lactate or isopropyl alcohol | 6.93% | 6.93% |
| Carbon dioxide ($CO_2$) | 2.85% | 0% |

Formulations A and B were tested according to the premises treatment procedures discussed above and the results are summarized in Table 2 below. Overall, the treated test systems exhibited 24-hour mean mortality of greater than 80% for the majority of the pest or insects treated with Formulations A and B, while all untreated test systems exhibited 24-hour mean mortality of less than 10%, thereby exhibiting the efficacy of formulations of the present disclosure.

TABLE 2

Efficacy data for Formulations A and B.

| Efficacy | Formulation A | Formulation B |
|---|---|---|
| American cockroach (Periplaneta americana) mean % knockdown 30 seconds | 26% | 54% |
| American cockroach (Periplaneta americana) mean % mortality 24 hours | 96% | 100% |
| German cockroach (Blattella germanica) mean % knockdown 30 seconds | 98% | 100% |
| German cockroach (Blattella germanica) mean % mortality 24 hours | 100% | 100% |
| Argentine ant (Linepithema humile) mean % knockdown 30 seconds | 100% | 100% |
| Argentine ant (Linepithema humile) mean % mortality 24 hours | 100% | 100% |
| Pharaoh ant (Monomorium pharaonis) mean % knockdown 30 seconds | 100% | 100% |
| Pharaoh ant (Monomorium pharaonis) mean % mortality 24 hours | 100% | 100% |

Example 2

In addition to studying the efficacy of several formulations of the present disclosure, the effect of changing the relative amounts of the at least one mint oil (e.g., spearmint oil, peppermint oil, cornmint oil) and rosemary oil was studied. In other words, the effect of altering the ratio of the at least one mint oil (e.g., spearmint oil, peppermint oil, cornmint oil) to rosemary oil was studied. Here, Formulations 1-8 were prepared according to the weight percentages shown in Tables 3 and 4. To keep other variables constant, the total amount of essential oils was kept constant at 5%, and the other ingredients included in the formulations were also kept constant at 10% butyl lactate, 10% isopropyl myristate, and 75% mineral oil.

As shown in Tables 3 and 4, Formulation 1 included 100% mint oil and did not include any rosemary oil, while Formulation 2 included 100% rosemary oil and did not include a mint oil. Further, Formulations 3-8 tested ratios between the mint oil (i.e., spearmint oil, in this embodiment) and rosemary oil of 10:1 (Formulation 3), 3:1 (Formulation 4), 1.5:1 (Formulation 5), 1:1 (Formulation 6), 1:10 (Formulation 7), and 1:3 (Formulation 8).

TABLE 3

Components of Formulations 1-4.

| Ingredient | Formulation 1 (wt. %) | Formulation 2 (wt. %) | Formulation 3 (wt. %) | Formulation 4 (wt. %) |
|---|---|---|---|---|
| Spearmint Oil | 5.00% | 0.00% | 4.545% | 3.75% |
| Rosemary Oil | 0.00% | 5.00% | 0.455% | 1.25% |
| Butyl Lactate | 10.00% | 10.00% | 10.00% | 10.00% |
| Isopropyl Myristate | 10.00% | 10.00% | 10.00% | 10.00% |
| Mineral Oil | 75.00% | 75.00% | 75.00% | 75.00% |

TABLE 4

Components of Formulations 5-8.

| Ingredient | Formulation 5 (wt. %) | Formulation 6 (wt. %) | Formulation 7 (wt. %) | Formulation 8 (wt. %) |
| --- | --- | --- | --- | --- |
| Spearmint Oil | 3.00% | 2.50% | 0.45% | 1.25% |
| Rosemary Oil | 2.00% | 2.50% | 4.55% | 3.75% |
| Butyl Lactate | 10.00% | 10.00% | 10.00% | 10.00% |
| Isopropyl Myristate | 10.00% | 10.00% | 10.00% | 10.00% |
| Mineral Oil | 75.00% | 75.00% | 75.00% | 75.00% |

The efficacy data, including the knockdown percentage (after 30 seconds) and mortality percentage (after 24 hours), was observed for one crawling insect (*Blattella germanica*). The results from the efficacy tests are provided in Table 5 below.

As shown in the efficacy data in Table 5, each ratio of mint oil (i.e., spearmint oil, in this embodiment) to rosemary oil exhibited strong knockdown and strong mortality results. Overall, the treated test systems exhibited 24-hour mean mortality of about 100%, and 30-second knockdown of greater than 90%, and in particular greater than 96%, thereby exhibiting the efficacy of formulations of the present disclosure and the wide range of ratios the mint oil and the rosemary oil may be in relative to one another while still providing optimal insecticidal properties.

TABLE 5

Efficacy Data for Formulations 1-8.

| Formulation | German cockroach (*Blattella germanica*) mean % knockdown 30 seconds | German cockroach (*Blattella germanica*) mean % mortality 24 hours |
| --- | --- | --- |
| 1 | 98.34% | 100% |
| 2 | 96.67% | 100% |
| 3 | 96.67% | 100% |
| 4 | 96.67% | 100% |
| 5 | 96.67% | 100% |
| 6 | 96.67% | 100% |
| 7 | 100% | 100% |
| 8 | 96.67% | 100% |

Example 3

The effect of changing the total weight percentage of the active components, such as the total amount of the at least one mint oil (e.g., spearmint oil, peppermint oil, cornmint oil) and rosemary oil, was also studied. In other words, the effect of altering the total weight percentage of the at least one mint oil (e.g., spearmint oil, peppermint oil, cornmint oil) and the rosemary oil was studied. Here, Formulations 9-14 were prepared according to the weight percentages shown in Tables 6 and 7. To keep other variables constant, the ratio of the essential oils to one another was kept constant at 1:1 and the other ingredients and their weight percentages were determined based on the weight percentages of the essential oils.

As shown in Table 6, Formulation 9 included 100 wt. % essential oil, Formulation 10 included 50 wt. % essential oil, Formulation 11 included 25 wt. % essential oil, and Formulation 12 included 15 wt. % essential oil.

TABLE 6

Components of Formulations 9-12.

| Ingredient | Formulation 9 (wt. %) | Formulation 10 (wt. %) | Formulation 11 (wt. %) | Formulation 12 (wt. %) |
| --- | --- | --- | --- | --- |
| Spearmint Oil | 50.00% | 25.00% | 12.50% | 7.50% |
| Rosemary Oil | 50.00% | 25.00% | 12.50% | 7.50% |
| Butyl Lactate | 0.00% | 5.26% | 7.89% | 8.95% |
| Isopropyl Myristate | 0.00% | 5.26% | 7.89% | 8.95% |
| Mineral Oil | 0.00% | 39.47% | 59.21% | 67.11% |

As shown in Table 7, Formulation 13 included 0.5 wt. % essential oil and Formulation 14 included 0.05 wt. % essential oil.

TABLE 7

Components of Formulations 13 and 14.

| Ingredient | Formulation 13 (wt. %) | Formulation 14 (wt. %) |
| --- | --- | --- |
| Spearmint Oil | 0.25% | 0.025% |
| Rosemary Oil | 0.25% | 0.025% |
| Butyl Lactate | 10.47% | 10.52% |
| Isopropyl Myristate | 10.47% | 10.52% |
| Mineral Oil | 78.55% | 78.91% |

The efficacy data, including the knockdown percentage (after 30 seconds) and mortality percentage (after 24 hours), was observed for one crawling insect (*Blattella germanica*). The results from the efficacy tests are provided in Table 8 below.

As shown in the efficacy data in Table 8, the formulations exhibited strong knockdown and strong mortality results when the total active component (i.e., the total essential oil percentage) was between a range of 0.05 wt. % and 15 wt. %. In particular, formulations having essential oils in weight percentages between 0.05 wt. % and 15 wt. % exhibited 24-hour mean mortality of about 100% and 30-second knockdown of about 100%. Additionally, although weight percentages above 15 wt. % still exhibited high knockdown and mean mortality values, the formulations having total active components (i.e., total essential oil values) between 0.05 wt. % and 15 wt. % exhibited greater knockdown and mean mortality data.

TABLE 8

Efficacy Data for Formulations 9-14.

| Formulation | German cockroach (*Blattella germanica*) mean % knockdown 30 seconds | German cockroach (*Blattella germanica*) mean % mortality 24 hours |
| --- | --- | --- |
| 9 | 88.34% | 100% |
| 10 | 63.33% | 100% |
| 11 | 76.67% | 100% |
| 12 | 100% | 100% |
| 13 | 100% | 100% |
| 14 | 100% | 100% |

Example 4

The effect of changing the type of essential oil used in the formulations or compositions was also studied. Here, Formulations 15-18 were prepared according to the weight percentages shown in Table 9 using cinnamon oil (Formulation 15), elemi oil (Formulation 16), castor oil (Formulation 17), and geraniol (Formulation 18). To keep other variables constant, only one essential oil was used per formulation and the other ingredients remained constant, where the formulations included 10% butyl lactate, 10% isopropyl myristate, and 75% mineral oil.

TABLE 9

Components of Formulations 15-18.

| Ingredient | Formulation 15 (wt. %) | Formulation 16 (wt. %) | Formulation 17 (wt. %) | Formulation 18 (wt. %) |
| --- | --- | --- | --- | --- |
| Cinnamon Oil | 5.00% | 0.00% | 0.00% | 0.00% |
| Elemi Oil | 0.00% | 5.00% | 0.00% | 0.00% |
| Castor Oil | 0.00% | 0.00% | 5.00% | 0.00% |
| Geraniol Oil | 0.00% | 0.00% | 0.00% | 5.00% |
| Butyl Lactate | 10.00% | 10.00% | 10.00% | 10.00% |
| Isopropyl Myristate | 10.00% | 10.00% | 10.00% | 10.00% |
| Mineral Oil | 75.00% | 75.00% | 75.00% | 75.00% |

The efficacy data, including the knockdown percentage (after 30 seconds) and mortality percentage (after 24 hours), was observed for one crawling insect (*Blattella germanica*). The results from the efficacy tests are provided in Table 10 below.

As shown in the efficacy data in Table 10, formulations including other oils exhibited inferior 30-second and 24-hour mean mortality data compared to formulations prepared according to an embodiment of the present disclosure. For example, formulations including other oils exhibited 30-second knockdown values of less than 85%, while formulations of the present disclosure consistently exhibited 30-second knockdown values of greater than 96% and 24-mortality values of about 100%, as shown in Examples 1 and 2 of the present disclosure. As such, this example helps showcase the efficacy of formulations of the present disclosure compared to formulations having other oils and other formulations without an active component having the synergy effect of the combination of at least one mint oil and rosemary oil.

TABLE 10

Efficacy Data for Formulations 15-18.

| Formulation | German cockroach (*Blattella germanica*) mean % knockdown 30 seconds | German cockroach (*Blattella germanica*) mean % mortality 24 hours |
| --- | --- | --- |
| 15 | 83.34% | 100% |
| 16 | 53.33% | 70% |
| 17 | 63.33% | 90% |
| 18 | 73.33% | 83.33% |

Example 5

The effect of changing the weight percentages and the type of solvent (e.g., isopropyl alcohol, butyl lactate, propylene carbonate, etc.) was also studied. For this study and example, Formulations 19-30 were prepared according to the weight percentages shown in Tables 11-13. To keep other variables constant, the weight percentage and ratio of the essential oils was kept constant, i.e., 2.50 wt. % spearmint oil and 2.50 wt. % rosemary oil.

As shown in Table 11, Formulation 19 included 0.10% isopropyl alcohol, Formulation 20 included 1.00 wt. % isopropyl alcohol, Formulation 21 included 10.00 wt. % isopropyl alcohol, and Formulation 22 included 20.00 wt. % isopropyl alcohol.

TABLE 11

Components of Formulations 19-22.

| Ingredient | Formulation 19 (wt. %) | Formulation 20 (wt. %) | Formulation 21 (wt. %) | Formulation 22 (wt. %) |
| --- | --- | --- | --- | --- |
| Spearmint Oil | 2.50% | 2.50% | 2.50% | 2.50% |
| Rosemary Oil | 2.50% | 2.50% | 2.50% | 2.50% |
| Mineral Oil | 94.90% | 94.00% | 85.00% | 75.00% |
| Isopropyl Alcohol | 0.10% | 1.00% | 10.00% | 20.00% |

As shown in Table 12, Formulation 23 included 45 wt. % isopropyl alcohol, Formulation 24 included 50 wt. % isopropyl alcohol, Formulation 25 included 55 wt. % isopropyl alcohol, and Formulation 26 included 75 wt. % isopropyl alcohol.

TABLE 12

Components of Formulations 23-26.

| Ingredient | Formulation 23 (wt. %) | Formulation 24 (wt. %) | Formulation 25 (wt. %) | Formulation 26 (wt. %) |
| --- | --- | --- | --- | --- |
| Spearmint Oil | 2.50% | 2.50% | 2.50% | 2.50% |
| Rosemary Oil | 2.50% | 2.50% | 2.50% | 2.50% |
| Mineral Oil | 51.00% | 45.00% | 40.00% | 20.00% |
| Isopropyl Alcohol | 44.00% | 50.00% | 55.00% | 75.00% |

As shown in Table 13, Formulation 27 included 1 wt. % butyl lactate, Formulation 28 included 10 wt. % butyl lactate, Formulation 29 included 45 wt. % butyl lactate, and Formulation 30 included 55 wt. % butyl lactate.

TABLE 13

Components of Formulations 27-30.

| Ingredient | Formulation 27 (wt. %) | Formulation 28 (wt. %) | Formulation 29 (wt. %) | Formulation 30 (wt. %) |
| --- | --- | --- | --- | --- |
| Spearmint Oil | 2.50% | 2.50% | 2.50% | 2.50% |
| Rosemary Oil | 2.50% | 2.50% | 2.50% | 2.50% |
| Mineral Oil | 94.00% | 85.00% | 51.00% | 40.00% |
| Butyl Lactate | 1.00% | 10.00% | 44.00% | 55.00% |

The efficacy data, including the knockdown percentage (after 30 seconds) and mortality percentage (after 24 hours), was observed one crawling insect (*Blattella germanica*). The results from the efficacy tests are provided in Table 14 below.

As shown in the efficacy data in Table 14, overall higher concentrations of solvent typically coincided with higher efficacy values. However, many formulations of the present disclosure include solvent in lower concentrations, such as concentrations between 3 wt. % and 10 wt. %, for example. As a result, the test results exhibit that the improved efficacy in knockdown and mortality of the formulations of the present disclosure is not simply attributable to solvents of the formulations (e.g., isopropanol or butyl lactate), but rather attributable to the synergy of the combination of essential oils and other active components present in formulations of the present disclosure.

TABLE 14

Efficacy Data for Formulations 19-30.

| Formulation | German cockroach (Blattella germanica) mean % knockdown 30 seconds | German cockroach (Blattella germanica) mean % mortality 24 hours |
|---|---|---|
| 19 | 40% | 43.33% |
| 20 | 40% | 50% |
| 21 | 36.67% | 50% |
| 22 | 50% | 73.33% |
| 23 | 76.67% | 100% |
| 24 | 63.33% | 100% |
| 25 | 100% | 100% |
| 26 | 100% | 100% |
| 27 | 40% | 60% |
| 28 | 83.33% | 100% |
| 29 | 53.33% | 100% |
| 30 | 66.67% | 96.67% |

Example 6

The effect of changing the amount of the carrier was also studied. For this study and example, Formulations 31-34 were prepared according to the weight percentages shown in Tables 15 and 16. To keep other variables constant, the weight percentage and ratio of the essential oils was kept constant, while the amount of butyl lactate and isopropyl myristate (at a constant ratio of 1:1) was altered to offset the increase or decrease of carrier.

As shown in Table 15, Formulation 31 included 0% mineral oil, Formulation 32 included 30% mineral oil, Formulation 33 included 60% mineral oil, and Formulation 34 included 90% mineral oil.

TABLE 15

Components of Formulations 31-34.

| Ingredient | Formulation 31 (wt. %) | Formulation 32 (wt. %) | Formulation 33 (wt. %) | Formulation 34 (wt. %) |
|---|---|---|---|---|
| Spearmint Oil | 2.50% | 2.50% | 2.50% | 2.50% |
| Rosemary Oil | 2.50% | 2.50% | 2.50% | 2.50% |
| Mineral Oil | 0.00% | 30.00% | 60.00% | 90.00% |
| Butyl Lactate | 47.50% | 32.50% | 17.50% | 2.50% |
| Isopropyl Myristate | 47.50% | 32.50% | 17.50% | 2.50% |

As shown in Table 16, Formulation 35 included 100% mineral oil.

TABLE 16

Components of Formulation 35.

| Ingredient | Formulation 35 (wt. %) |
|---|---|
| Spearmint Oil | 0.00% |
| Rosemary Oil | 0.00% |
| Mineral Oil | 100.00% |
| Butyl Lactate | 0.00% |
| Isopropyl Myristate | 0.00% |

The efficacy data, including the knockdown percentage (after 30 seconds) and mortality percentage (after 24 hours), was observed for one crawling insect (Blattella germanica). The results from the efficacy tests are provided in Table 17 below.

As shown in the efficacy data in Table 17, the efficacy of the formulations was not significantly affected by the amount of carrier present in the formulation. In line with the results of Example 5 and Example 7 discussed below, higher efficacy values were observed when the solvents or dehydrate (i.e., butyl lactate and isopropyl myristate in this embodiment) were in higher concentrations and the carrier was in lower concentrations. However, as many formulations of the present disclosure include a carrier in higher concentrations, such as between 60 wt. % and 90 wt. %, for example, the test results exhibit that the improved efficacy in knockdown and mortality data is not simply attributable to high concentrations of a carrier, such as high concentrations of a mineral oil. Rather, the higher efficacy knockdown and mortality data is attributable to the synergy of the combination of essential oils and other active components present in the formulations of the present disclosure.

TABLE 17

Efficacy Data for Formulations 31-35.

| Formulation | German cockroach (Blattella germanica) mean % knockdown 30 seconds | German cockroach (Blattella germanica) mean % mortality 24 hours |
|---|---|---|
| 31 | 80% | 100% |
| 32 | 86.67% | 76.67% |
| 33 | 66.67% | 76.67% |
| 34 | 60% | 73.33% |
| 35 | 0% | 61.67% |

Example 7

The effect of changing the weight percentages and the type of dehydrate was also studied. For this study and example, Formulations 36-39 were prepared according to the weight percentages shown in Table 18. To keep other variables constant, the weight percentage and ratio of the essential oils was kept constant, i.e., 2.50 wt. % spearmint oil and 2.50 wt. % rosemary oil.

As shown in Table 18, Formulation 36 included 0.1 wt. % isopropyl myristate, Formulation 37 included 10% isopropyl myristate, Formulation 38 included 30 wt. % isopropyl myristate, and Formulation 39 included 75 wt. % isopropyl myristate.

TABLE 18

Components of Formulations 36-39.

| Ingredient | Formulation 36 (wt. %) | Formulation 37 (wt. %) | Formulation 38 (wt. %) | Formulation 39 (wt. %) |
|---|---|---|---|---|
| Spearmint Oil | 2.50% | 2.50% | 2.50% | 2.50% |
| Rosemary Oil | 2.50% | 2.50% | 2.50% | 2.50% |
| Mineral Oil | 94.90% | 85.00% | 65.00% | 20.00% |
| Isopropyl Myristate | 0.10% | 10.00% | 30.00% | 75.00% |

The efficacy data, including the knockdown percentage (after 30 seconds) and mortality percentage (after 24 hours), was observed for one crawling insect (*Blattella germanica*). The results from the efficacy tests are provided in Table 19 below.

As shown in the efficacy data in Table 19, overall higher concentrations of a dehydrate, such as isopropyl myristate, typically coincided with higher efficacy values. However, many formulations of the present disclosure include the dehydrate in lower concentrations, such as concentrations between about 1 wt. % and about 15 wt. %, for example. Therefore, the test results of the present example showcase that the improved efficacy in knockdown and mortality of the formulations of the present disclosure is not simply attributable to dehydrates (e.g., isopropyl myristate) and their concentration in the formulation, but rather attributable to the synergy of the combination of essential oils and other active components present in formulations of the present disclosure.

TABLE 19

Efficacy Data for Formulations 36-39.

| Formulation | German cockroach (*Blattella germanica*) mean % knockdown 30 seconds | German cockroach (*Blattella germanica*) mean % mortality 24 hours |
|---|---|---|
| 36 | 40% | 70% |
| 37 | 70% | 100% |
| 38 | 86.67% | 96.67% |
| 39 | 76.67% | 100% |

Example 8

The effect of changing the weight percentage of the propellant was also studied. For this study and example, Formulations 40-43 were prepared according to the weight percentages shown in Tables 20. To keep other variable constant, the weight percentage and ratio of the essential oils was kept constant, i.e., 2.50 wt. % spearmint oil and 2.50 wt. % rosemary oil.

As shown in Table 20, Formulation 40 included 1.00% liquid petroleum gas (LPG), Formulation 41 included 3.00% LPG, Formulation 42 included 5.00% LPG, and Formulation 43 included 10.00% LPG.

TABLE 20

Components of Formulations 40-43.

| Ingredient | Formulation 40 (wt. %) | Formulation 41 (wt. %) | Formulation 42 (wt. %) | Formulation 43 (wt. %) |
|---|---|---|---|---|
| Spearmint Oil | 2.50% | 2.50% | 2.50% | 2.50% |
| Rosemary Oil | 2.50% | 2.50% | 2.50% | 2.50% |
| Mineral Oil | 94.00% | 92.00% | 90.00% | 85.00% |
| LPG | 1.00% | 3.00% | 5.00% | 10.00% |

The efficacy data, including the knockdown percentage (after 30 seconds) and mortality percentage (after 24 hours), was observed for one crawling insect (*Blattella germanica*). The results from the efficacy tests are provided in Table 21 below.

As shown in the efficacy data in Table 21, the testing results showcase optimal propellant amounts that may be used in combination with the formulations of the present disclosure, if an aerosol formulation is desired. Although this testing was only performed for LPG, it should be understood that other propellants, including but not limited to, carbon dioxide and nitrogen, for example, may also be used in combination with the formulations of the present disclosure.

TABLE 21

Efficacy Data for Formulations 41-43.

| Formulation | German cockroach (*Blattella germanica*) mean % knockdown 30 seconds | German cockroach (*Blattella germanica*) mean % mortality 24 hours |
|---|---|---|
| 41 | 0.00% | 0.00% |
| 42 | 0.00% | 50.00% |
| 43 | 100.00% | 100.00% |

Example 9

The effect of the carrier used for the formulations and compositions was further tested. For this example, Formulations 44-51 were prepared according to the ingredients and weight percentages listed in Tables 22 and 23. Formulations 44-46 are water-based insecticidal formulations, rather than oil-based insecticidal formulations, and include about 4.7% to about 4.8% spearmint oil; about 2.6% rosemary oil; about 24% to about 68% water; about 10.4% isopropyl myristate; about 6.5% ethyl lactate; about 6.5% butyl lactate; about 0% to about 3.0% sodium lauryl sulfate; about 0% to about 42% glyceryl monooleate; about 0% to about 0.30% sodium benzoate; about 0% to about 1.2% saponin; and about 0% to about 0.80% polyglyceryl oleate.

TABLE 22

Components of Formulations 44-46

| Ingredient | Formulation 44 (wt. %) | Formulation 45 (wt. %) | Formulation 46 (wt. %) |
|---|---|---|---|
| Spearmint oil | 4.75% | 4.70% | 4.70% |
| Rosemary oil | 2.59% | 2.57% | 2.57% |
| Water | 67.26% | 65.33% | 24.62% |
| Isopropyl myristate | 10.40% | 10.40% | 10.40% |
| Ethyl lactate | 6.50% | 6.50% | 6.50% |
| Butyl lactate | 6.50% | 6.50% | 6.50% |
| Sodium lauryl sulfate | 0.00% | 0.22% | 2.70% |
| Glyceryl monooleate | 0.00% | 3.48% | 41.71% |
| Sodium benzoate | 0.00% | 0.30% | 0.30% |
| Saponin | 1.20% | 0.00% | 0.00% |
| Polyglyceryl-10 oleate | 0.8% | 0.00% | 0.00% |

Second, the following ingredients in Table 23 were used to prepare Formulations 47-51.

Formulations 47-51 are also water-based insecticidal formulations and comprise about 1.0% to about 4.7% spearmint oil; about 0.6% to about 7.5% rosemary oil; about 65% to about 81% water; about 0% to about 10.4% isopropyl myristate; about 6.5% ethyl lactate, about 0% to about 6.5% butyl lactate; about 0.6% or 3.7% surfactant; and about 0% to about 0.3% preservative.

TABLE 23

Components of Formulations 47-51.

| Ingredient | Formulation 47 (wt. %) | Formulation 48 (wt. %) | Formulation 49 (wt. %) | Formulation 50 (wt. %) | Formulation 51 (wt. %) |
|---|---|---|---|---|---|
| Spearmint oil | 4.70% | 4.098% | 4.70% | 2.50% | 1.00% |
| Rosemary oil | 2.57% | 7.50% | 2.57% | 1.37% | 0.55% |
| Water | 75.73% | 77.00% | 65.33% | 77.23% | 80.93% |
| Isopropyl myristate | 0.00% | 10.40% | 10.40% | 10.40% | 10.40% |
| Ethyl lactate | 6.50% | 6.50% | 6.50% | 6.50% | 6.50% |
| Butyl lactate | 6.50% | 0.00% | 6.50% | 0.00% | 0.00% |
| Sodium Lauryl Sulfate or Sodium Oleate or Potassium Oleate or Sodium Ricinolate | 0.22% | 0.00% | 2.70% | 0.00% | 0.62% |
| Glyceryl monooleate | 3.48% | 0.00% | 1.00% | 0.00% | 0.00% |
| Polyglyceryl oleate | 0.00% | 0.80% | 0.00% | 0.80% | 0.00% |
| Saponin | 0.00% | 1.20% | 0.00% | 1.20% | 0.00% |
| Sodium benzoate | 0.30% | 0.00% | 0.30% | 0.00% | 0.00% |

Formulations 45 and 47-51 were tested according to the premises treatment procedures discussed above. The results are summarized in Table 24 below. Formulation 49 showed exceptional performance with 90% or greater efficacy in all species tests for both knockdown (30 seconds) and mortality (24 hours).

TABLE 24

Efficacy data of formulations 45 and 47-51.

| Efficacy | 45 | 47 | 48 | 49 | 50 | 51 |
|---|---|---|---|---|---|---|
| American cockroach (*Periplaneta americana*) mean % knockdown 30 seconds | 0% | 0% | 20% | 90% | 0% | 0% |
| American cockroach (*Periplaneta americana*) mean % mortality 24 hours | 0% | 0% | 100% | 100% | 0% | 0% |
| German cockroach (*Blattella germanica*) mean % knockdown 30 seconds | 20% | 13% | 12% | 100% | 0% | 0% |
| German cockroach (*Blattella germanica*) mean % mortality 24 hours | 80% | 28% | 22% | 100% | 23% | 0% |
| Argentine ant (*Linepithema humile*) mean % knockdown 30 seconds | 0% | 0% | 0% | 100% | 0% | 0% |
| Argentine ant (*Linepithema humile*) mean % mortality 24 hours | 0% | 0% | 0% | 100% | 0% | 0% |
| Pharaoh ant (*Monomorium pharaonis*) mean % knockdown 30 seconds | 0% | 0% | 0% | 100% | 0% | 0% |
| Pharaoh ant (*Monomorium pharaonis*) mean % mortality 24 hours | 0% | 0% | 0% | 100% | 0% | 0% |

Example 10

Other formulations according to other embodiments of the present disclosure were also tested and efficacy data, including repellency data, was collected. In particular, repellent efficacy data was collected for a formulation having an active component with at least one mint oil and rosemary oil. In this example, the ratio between the at least one mint oil (e.g., spearmint oil) and rosemary oil was also kept constant, but the specific weight percentages of the at least one mint oil and rosemary oil was increased to produce a formulation that could be emitted from a device. Further, the number of other active ingredients (e.g., sodium lauryl sulfate) and other inert ingredients (e.g., mineral oil, glyceryl monooleate, saponin, sodium benzoate) was decreased, such that the formulation tested included an active component having only one mint oil (i.e., spearmint oil) and rosemary, and the inert component included only a solvent (i.e., ethyl lactate, butyl lactate, or isopropyl alcohol, or propylene carbonate). Further, in this example, embodiments of the present disclosure were tested using a dispenser mechanism, such as one of the insect repellency devices disclosed in U.S. application Ser. Nos. 17/837,110 and 17/878,629, the entire contents of which are incorporated herein by reference.

More particularly, the ingredients in Table 25 were used to prepare Formulation 52. Formulation 52 is an insect repellent composition comprising about 32.5 wt. % spearmint oil; about 17.5 wt. % rosemary oil; and about 50% ethyl lactate or butyl lactate or isopropyl alcohol or propylene carbonate.

TABLE 25

Components of Formulation 52.

| Ingredient | Formulation 52 (wt. %) |
|---|---|
| Spearmint oil | 32.50% |
| Rosemary oil | 17.50% |
| Ethyl Lactate or Butyl Lactate or Isopropyl Alcohol or Propylene Carbonate | 50.00% |

Test plots were constructed including two walls and a flat and level table was placed about 5 ft. from the vertex of the walls. Next, traps were placed around the perimeter of a 6 ft. diameter circle, centralized around the table. More so, two other traps were placed 120 degrees away from the initial trap around the perimeter of the circle.

A pre-count period was run for 30 minutes, after which collection bags were removed and replaced with new, collection bags for four intervals. After collection, mosquitos in the collection bags were taken to be counted.

Percent repellency versus the untreated control was calculated for each data point (each 30-minute collection over the 2-hour test period). The percent repellency was calculated by adding the number of mosquitos in the three traps at each test plot per time point and comparing that number to the total number of mosquitoes in the three traps of the untreated control plot per time point.

Repellency results were collected for this formulation and the percent repellency is shown Table 26 below. The median of the repellency results and a 95% confidence level around the sample median was also calculated, both of which are also provided in Table 26.

As shown in Table 26, embodiments of the present disclosure also provided desired repellency effects. The overall median percent repellency showed a significant reduction of captured mosquitoes in the treatment zone compared to an untreated area, thereby supporting the premise that the test substance is also highly effective at repelling mosquitoes.

TABLE 26

Repellency results for Formulation 52.

| Measure | Value | |
|---|---|---|
| Data values | 1.5% | 99.60% |
| | 46.50% | 99.70% |
| | 46.50% | 99.90% |

TABLE 26-continued

Repellency results for Formulation 52.

| Measure | Value | |
|---|---|---|
| | 51.70% | 99.90% |
| | 87.80% | 99.90% |
| | 98.60% | 100.00% |
| | 98.80% | 100.00% |
| | 99.10% | 100.00% |
| Median percent repellency | 99.30% | |
| 95% LCL of the median | 87.80% | |

Another repellency test was performed using Formulation 52 in a device disclosed in U.S. application Ser. No. 17/878,629, filed on Aug. 1, 2022, and titled "Volatile Material Dispenser," the entire contents of which is incorporated herein by reference. Here, several test sites were constructed having several radii of collection. Further, the dispensing devices operated on variable duty cycles (i.e., seconds dispensing/seconds not dispensing). Even further, the timing of the tests included a 30-minute control at each site, an activation of the device, and then collection of the mosquitoes every 30 minutes thereafter for 2 hours. The specific testing procedures for each site are discussed below and the results of these repellency tests are provided in Tables 27-30 below.

Test #1 had a 6 ft. diameter and a 12/12 duty cycle (i.e., 12 seconds of dispensing and 12 seconds not dispensing ("off")).

TABLE 27

Repellency Results of Formulation 52 at Test Site #1

| Collection Time | Day 1 | Day 2 | Day 3 | Day 4 | Average (including Day 1) |
|---|---|---|---|---|---|
| 0.5 hour | 72.0% | 65.8% | 54.4% | 84.0% | 85.1% |
| 1.0 hour | 86.1% | 90.2% | 84.1% | 98.5% | |
| 1.5 hour | 80.8% | 99.8% | 91.7% | 99.6% | |
| 2.0 hour | 79.2% | 98.3% | 78.3% | 97.0% | |

Test Site #2 had an 8 ft. diameter and a 12/12 duty cycle.

TABLE 28

Repellency Results of Formulation 52 at Test Site #2

| Collection Time | Day 1 | Day 2 | Day 3 | Day 4 | Average (including Day 1) |
|---|---|---|---|---|---|
| 0.5 hour | — | — | 59.6% | 93.4% | 98.40% |
| 1.0 hour | 76.5% | 99.1% | 97.0% | 99.4% | |
| 1.5 hour | 100.0% | 100.0% | 100.0% | 99.8% | |
| 2.0 hour | 64.8% | 100.0% | 97.8% | 98.9% | |

Test Site #3 had a 10 ft. diameter and a 12/12 duty cycle.

TABLE 29

Repellency Results of Formulation 52 at Test Site #3

| Collection Time | Day 1 | Day 2 | Day 3 | Day 4 | Average (including Day 1) |
|---|---|---|---|---|---|
| 0.5 hour | 6.3% | 79.4% | — | 92.2% | 98.60% |
| 1.0 hour | 100.0% | 100.0% | 97.3% | 97.5% | |
| 1.5 hour | 89.2% | 99.8% | 100.0% | 99.8% | |
| 2.0 hour | 64.8% | 99.6% | 100.0% | 100.0% | |

Test Site #4 had a 6 ft. diameter and a 6/18 duty cycle.

TABLE 30

Repellency Results of Formulation 52 at Test Site #4

| Collection Time | Day 1 | Day 2 | Day 3 | Day 4 | Average (including Day 1) |
|---|---|---|---|---|---|
| 0.5 hour | 51.7% | 1.5% | 87.8% | 98.8% | 99.30% |
| 1.0 hour | 46.5% | 99.6% | 99.9% | 99.9% | |
| 1.5 hour | 100.0% | 99.7% | 100.0% | 100.0% | |
| 2.0 hour | 46.5% | 99.1% | 98.6% | 99.9% | |

As shown in Tables 27-30, the embodiments of the present disclosure also provide desired repellency effects when used with dispensing devices. While timepoints and device failures occurred at some instances, the overall percent repellency showed a significant reduction of captured mosquitoes in the treatment zone compared to an untreated area, thereby supporting that the test substance is highly effective at repelling mosquitoes.

The various methods and techniques described above provide a number of ways to carry out embodiments of the present disclosure. Of course, it is to be understood that not necessarily all objectives or advantages described may be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as may be taught or suggested herein. A variety of advantageous and disadvantageous alternatives are mentioned herein. It is to be understood that some preferred embodiments specifically include one, another, or several advantageous features, while others specifically exclude one, another, or several disadvantageous features, while still others specifically mitigate a present disadvantageous feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be mixed and matched by one of ordinary skill in this art to perform methods in accordance with principles described herein. Among the various elements, features, and steps some will be specifically included, and others specifically excluded in diverse embodiments.

Although the invention has been disclosed in the context of certain embodiments and examples, it will be understood by those skilled in the art that the embodiments of the invention extend beyond the specifically disclosed embodiments to other alternative embodiments and/or uses and modifications and equivalents thereof.

Many variations and alternative elements have been disclosed in embodiments of the present invention. Still further variations and alternate elements will be apparent to one of skill in the art. Among these variations, without limitation, are the at least two active ingredients selected for the pest control composition, the target pest, and the amounts of the various ingredients present in the pest control composition. Various embodiments of the invention can specifically include or exclude any of these variations or elements.

In some embodiments, the numbers expressing quantities of ingredients, properties such as weight percentages, percent repellency, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

In some embodiments, the terms "a" and "an" and "the" and similar references used in the context of describing a particular embodiment of the present disclosure (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Particular embodiments of the present disclosure are described herein, including the best mode known to the inventors for carrying out the invention. Variations on those preferred embodiments will become apparent to those of ordinary skill in the art upon reading the foregoing description. It is contemplated that skilled artisans can employ such variations as appropriate, and the invention can be practiced otherwise than specifically described herein. Accordingly, many embodiments of this invention include all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Each of the above cited references and printed publications are herein individually incorporated by reference in their entirety.

It is to be understood that the embodiments of the invention disclosed herein are illustrative of the principles of the present invention. Other modifications that can be employed can be within the scope of the invention. Thus, by way of example, but not of limitation, alternative configurations of the present invention can be utilized in accordance with the teachings herein. Accordingly, embodiments of the present invention are not limited to that precisely as shown and described.

INDUSTRIAL APPLICABILITY

Numerous modifications to the present disclosure will be apparent to those skilled in the art in view of the foregoing description. Accordingly, this description is to be construed as illustrative only and is presented for the purpose of enabling those skilled in the art to make and use the disclosure and to teach the best mode of carrying out same. The exclusive rights to all modifications which come within the scope of the appended claims are reserved.

I claim:

1. A pest control composition, the composition comprising:
   an active component comprising:
      a) between about 0.1 wt. % and about 11 wt. % of a mint oil selected from the group consisting of spearmint oil, peppermint oil, and cornmint oil; and
      b) between about 0.05 wt. % and about 5 wt. % rosemary oil;
   a carrier;
   a solvent; and
   a dehydrate,
   wherein all weight percentages are percent by weight of the total composition;
   wherein a weight ratio of the mint oil to rosemary oil is from about 1.5:1 to about 2.2:1;
   wherein the carrier is selected from the group consisting of mineral oil, aliphatic $C_9$-$C_{14}$ hydrocarbons, alicyclic $C_9$-$C_{14}$ hydrocarbons, naphtha, petroleum distillate, paraffins, iso-paraffins, isoparaffinic hydrocarbons, cycloparaffins, alkanes, iso-alkanes, cycloalkanes, and any combinations thereof;
   wherein the solvent is selected from the group consisting of ethyl lactate, butyl lactate, isopropyl alcohol, propylene carbonate, and any combinations thereof; and
   wherein the dehydrate is isopropyl myristate.

2. The composition of claim 1, wherein the active component is between about 0.5 wt. % and about 3 wt. %.

3. The composition of claim 1, wherein the mint oil is between about 1 wt. % and about 2 wt. % and the rosemary oil is between about 0.6 wt. % and about 1 wt. %.

4. The composition of claim 1, wherein the composition comprises about 60 wt. % to about 90 wt. % of the carrier, about 3 wt. % to about 10 wt. % of the solvent, about 1 wt. % to about 15 wt. % of the dehydrate, and about 1 wt. % to about 5 wt. % of a propellant.

5. The composition of claim 4, wherein the propellant is selected from the group consisting of compressed gas propellants, liquefied gas propellants, saturated hydrocarbons, mixtures of liquified gas and compressed gas, methane, ethane, propane, pentane, isobutene, n-butane, isobutane, dimethyl ether, 1, 1-difluoroethane, 1,1,1,2-tetrafluoroethane, carbon dioxide, nitrogen, air, and any combinations thereof.

6. The composition of claim 1, wherein the carrier is mineral oil.

7. The composition of claim 1, wherein the mint oil is spearmint oil.

8. The composition of claim 1, wherein the mint oil is peppermint oil.

9. The composition of claim 1, wherein the mint oil is cornmint oil.

10. The composition of claim 1, wherein the mint oil is between about 0.5 wt. % and about 7 wt. %.

11. The composition of claim 1, wherein the mint oil is between about 1 wt. % and about 2 wt. %.

12. The composition of claim 1, wherein the mint oil is about 1.50 wt. %.

13. The composition of claim 1, wherein the rosemary oil is between about 0.5 wt. % and about 2.5 wt. %.

14. The composition of claim 1, wherein the rosemary oil is between about 0.6 wt. % and about 1 wt. %.

15. The composition of claim 1, wherein the rosemary oil is between about 0.7 wt. % and about 0.9 wt. %.

16. The composition of claim 1, wherein the active component is between about 1 wt. % and about 3 wt. %.

17. The composition of claim 1, wherein the active component is between about 2 wt. % and about 3 wt. %.

18. The composition of claim 1, wherein the active component is between about 2 wt. % and about 2.5 wt. %.

19. The composition of claim 1, wherein the carrier is mineral oil and the solvent is ethyl lactate.

20. The composition of claim 19, wherein the composition comprises about 75 wt. % to about 80 wt. % of the carrier, about 6 wt. % to about 8 wt. % of the solvent, and about 10 wt. % to about 12 wt. % of the dehydrate.

* * * * *